(12) United States Patent
Coffey

(10) Patent No.: US 8,257,018 B2
(45) Date of Patent: Sep. 4, 2012

(54) WIND ENERGY CONVERSION DEVICES

(76) Inventor: Daniel P. Coffey, Naperville, IL (US)

( * ) Notice: Subject to any disclaimer, the term of this patent is extended or adjusted under 35 U.S.C. 154(b) by 0 days.

(21) Appl. No.: 13/007,311

(22) Filed: Jan. 14, 2011

(65) Prior Publication Data

US 2011/0176919 A1     Jul. 21, 2011

Related U.S. Application Data

(60) Provisional application No. 61/295,053, filed on Jan. 14, 2010.

(51) Int. Cl.
*F03D 1/02*     (2006.01)

(52) U.S. Cl. ............ 415/4.2; 415/4.4; 415/907; 290/44; 290/55

(58) Field of Classification Search ............... 415/4.2, 415/4.4, 907; 290/44, 55
See application file for complete search history.

(56) References Cited

U.S. PATENT DOCUMENTS

| | | |
|---|---|---|
| 1,835,018 A | 12/1931 | Darrieus |
| 1,915,689 A | 6/1933 | Moore |
| 2,867,283 A | 1/1959 | Shanahan |
| 3,793,530 A | 2/1974 | Carter |
| 3,902,072 A | 8/1975 | Quinn |
| 3,918,839 A | 11/1975 | Blackwell et al. |
| 3,986,785 A | 10/1976 | Ferencz |
| 4,047,833 A | 9/1977 | Decker |
| 4,052,134 A | 10/1977 | Rumsey |
| 4,105,363 A | 8/1978 | Loth |
| 4,122,675 A | 10/1978 | Polyak |
| 4,150,301 A | 4/1979 | Bergey, Jr. |
| 4,154,556 A | 5/1979 | Webster |
| 4,168,439 A | 9/1979 | Palma |
| 4,168,759 A | 9/1979 | Hull et al. |
| 4,178,126 A | 12/1979 | Weed |
| 4,180,367 A | 12/1979 | Drees |
| 4,237,384 A | 12/1980 | Kennon |
| 4,247,251 A | 1/1981 | Wuenscher |
| 4,260,325 A | 4/1981 | Cymara |
| 4,293,279 A | 10/1981 | Bolie |
| 4,299,537 A | 11/1981 | Evans |

(Continued)

FOREIGN PATENT DOCUMENTS

AU     200178252 A1     4/2002

(Continued)

OTHER PUBLICATIONS

Eriksson, S., et al., "Evaluation of different turbine concepts for wind power", Renewable and Sustainable Energy Reviews, 2008, 12:1419-1434.

(Continued)

*Primary Examiner* — Igor Kershteyn
(74) *Attorney, Agent, or Firm* — Drinker Biddle & Reath LLP

(57) ABSTRACT

A wind turbine for harvesting energy from both horizontal and vertical wind currents having an open frame structure and a central passage through the structure with at least three wind energy harvesting generally vertically disposed and rotatably mounted blades positioned about the central passage and at least three wind energy harvesting generally horizontal blades projecting radially from the central vertical axis of the device. The open frame structure includes a unique rod and cable central structure offset from the periphery of the frame. In one embodiment, the frame structure is suspended from a rotatable hub at the top of a stationary mast.

19 Claims, 38 Drawing Sheets

U.S. PATENT DOCUMENTS

| | | | |
|---|---|---|---|
| 4,303,835 A | 12/1981 | Bair | |
| 4,355,956 A | 10/1982 | Ringrose et al. | |
| 4,368,392 A | 1/1983 | Drees | |
| 4,383,801 A | 5/1983 | Pryor | |
| 4,410,806 A | 10/1983 | Brulle | |
| 4,449,053 A | 5/1984 | Kutcher | |
| 4,452,046 A | 6/1984 | Valentin | |
| 4,457,669 A | 7/1984 | Corry | |
| 4,507,049 A | 3/1985 | Strandgren | |
| 4,530,642 A | 7/1985 | Yang | |
| 4,725,194 A | 2/1988 | Bartsch | |
| 4,764,090 A | 8/1988 | Danson | |
| 4,832,569 A | 5/1989 | Samuelsen et al. | |
| 4,890,976 A | 1/1990 | Jansson | |
| 5,126,584 A | 6/1992 | Ouellet | |
| 5,133,637 A | 7/1992 | Wadsworth | |
| 5,256,034 A | 10/1993 | Sultzbaugh | |
| 5,315,159 A | 5/1994 | Gribnau | |
| 5,332,354 A | 7/1994 | Lamont | |
| 5,375,324 A | 12/1994 | Wallace et al. | |
| 5,447,412 A | 9/1995 | Lamont | |
| 5,454,694 A | 10/1995 | O'Dell | |
| 5,503,525 A | 4/1996 | Brown et al. | |
| 5,676,524 A | 10/1997 | Lukas | |
| 6,160,336 A | 12/2000 | Baker, Jr. et al. | |
| 6,201,313 B1 | 3/2001 | Nakamats | |
| 6,302,778 B1 | 10/2001 | Andrews et al. | |
| 6,320,273 B1 | 11/2001 | Nemec | |
| 6,379,115 B1 | 4/2002 | Hirai | |
| 6,465,900 B1 | 10/2002 | Arcos | |
| 6,543,999 B1 | 4/2003 | Polen | |
| 6,582,291 B2 | 6/2003 | Clark | |
| 6,629,815 B2 | 10/2003 | Lusk | |
| 6,688,842 B2 | 2/2004 | Boatner | |
| 6,740,989 B2 | 5/2004 | Rowe | |
| 6,831,374 B2 | 12/2004 | Seki | |
| 6,857,846 B2 | 2/2005 | Miller | |
| 6,884,020 B2 | 4/2005 | Kaare, Jr. et al. | |
| D508,893 S | 8/2005 | Kato et al. | |
| 6,935,841 B2 | 8/2005 | Rainbow | |
| 6,974,309 B2 | 12/2005 | Seki | |
| 7,004,724 B2 | 2/2006 | Pierce et al. | |
| 7,025,671 B2 | 4/2006 | Lin | |
| 7,040,859 B2 | 5/2006 | Kane | |
| 7,084,520 B2 | 8/2006 | Zambrano et al. | |
| 7,109,599 B2 | 9/2006 | Watkins | |
| 7,144,214 B2 | 12/2006 | Kinpara et al. | |
| 7,235,893 B2 | 6/2007 | Platt | |
| 7,258,527 B2 | 8/2007 | Shih | |
| 7,276,809 B2 * | 10/2007 | Zambrano et al. | 290/55 |
| 7,303,369 B2 | 12/2007 | Rowan et al. | |
| 7,315,093 B2 | 1/2008 | Graham, Sr. | |
| 7,323,791 B2 | 1/2008 | Jonsson | |
| 7,344,353 B2 | 3/2008 | Naskali et al. | |
| 7,352,076 B1 | 4/2008 | Gabrys | |
| 7,385,302 B2 | 6/2008 | Jonsson | |
| 7,400,057 B2 | 7/2008 | Sureshan | |
| 7,417,334 B2 | 8/2008 | Uchiyama | |
| 7,445,431 B2 | 11/2008 | Larsen et al. | |
| 7,462,950 B2 | 12/2008 | Hu | |
| 7,550,865 B2 | 6/2009 | Jonsson | |
| 7,582,982 B1 | 9/2009 | Deal | |
| 7,586,209 B1 | 9/2009 | Lyatkher | |
| 7,665,966 B2 | 2/2010 | Warszewski | |
| 7,677,862 B2 | 3/2010 | Boatner | |
| 7,766,601 B2 | 8/2010 | Vida Marques | |
| 7,780,411 B2 | 8/2010 | Yan | |
| 2002/0079705 A1 | 6/2002 | Fowler | |
| 2005/0263057 A1 | 12/2005 | Green | |
| 2006/0153682 A1 | 7/2006 | Vanderhye et al. | |
| 2006/0156725 A1 | 7/2006 | Kenessey | |
| 2006/0257240 A1 | 11/2006 | Naskali et al. | |
| 2007/0222225 A1 | 9/2007 | Mahoney | |
| 2007/0243066 A1 | 10/2007 | Baron | |
| 2007/0257494 A1 | 11/2007 | Vida Marques | |
| 2008/0061559 A1 | 3/2008 | Hirshberg | |
| 2008/0106102 A1 | 5/2008 | Liao | |
| 2008/0213083 A1 | 9/2008 | Unno | |
| 2008/0227378 A1 | 9/2008 | Yokoi | |
| 2008/0246284 A1 | 10/2008 | Pelman et al. | |
| 2008/0247872 A1 | 10/2008 | Akcasu | |
| 2008/0253889 A1 | 10/2008 | Krivcov et al. | |
| 2008/0286112 A1 | 11/2008 | Rowan et al. | |
| 2008/0292467 A1 | 11/2008 | Borgen | |
| 2008/0315709 A1 * | 12/2008 | Uchiyama | 310/209 |
| 2009/0035134 A1 | 2/2009 | Kuo et al. | |
| 2009/0066088 A1 | 3/2009 | Liang | |
| 2009/0085355 A1 | 4/2009 | St-Germain et al. | |
| 2009/0095339 A1 | 4/2009 | Nightingale | |
| 2009/0096218 A1 | 4/2009 | Nightingale | |
| 2009/0097981 A1 | 4/2009 | Gabrys | |
| 2009/0140528 A1 | 6/2009 | Ireland | |
| 2009/0167025 A1 * | 7/2009 | Graham, Sr. | 290/55 |
| 2009/0169354 A1 | 7/2009 | Kelaiditis et al. | |
| 2009/0311096 A1 | 12/2009 | Herr et al. | |
| 2009/0322095 A1 | 12/2009 | Mazur | |
| 2010/0001525 A1 | 1/2010 | Yang | |
| 2010/0021296 A1 | 1/2010 | Nielsen | |
| 2010/0084863 A1 | 4/2010 | Potter | |
| 2010/0092292 A1 | 4/2010 | Nies et al. | |
| 2010/0096854 A1 | 4/2010 | Paluszek et al. | |
| 2010/0111689 A1 | 5/2010 | Davis | |
| 2010/0117371 A1 | 5/2010 | Ippolito et al. | |
| 2010/0126374 A1 | 5/2010 | Ji | |
| 2010/0133838 A1 | 6/2010 | Borgen | |
| 2010/0133851 A1 | 6/2010 | Devitt | |
| 2010/0213723 A1 | 8/2010 | Kazadi | |
| 2010/0232965 A1 | 9/2010 | Chang | |
| 2010/0233919 A1 | 9/2010 | Ersoy | |
| 2010/0253084 A1 | 10/2010 | Lin et al. | |
| 2010/0254798 A1 | 10/2010 | Tutt | |
| 2010/0264662 A1 | 10/2010 | Barber | |
| 2010/0270805 A1 | 10/2010 | Kazadi | |

FOREIGN PATENT DOCUMENTS

| | | |
|---|---|---|
| BE | 875907 | 8/1979 |
| BE | 1007505 A7 | 7/1995 |
| CA | 2107973 A1 | 4/1995 |
| CA | 2597042 A1 | 12/2008 |
| CA | 2197920 C | 5/2009 |
| CN | 1614231 A | 5/2005 |
| CN | 1727670 A | 2/2006 |
| CN | 1773108 A | 5/2006 |
| CN | 1892020 A | 1/2007 |
| CN | 101016878 A | 8/2007 |
| CN | 101126373 A | 2/2008 |
| CN | 101251087 A | 8/2008 |
| DE | 4026575 A1 | 2/1992 |
| DE | 19919133 A1 | 11/2000 |
| DE | 20204945 U1 | 7/2003 |
| DE | 10212354 A1 | 10/2003 |
| DE | 102006029767 A1 | 5/2007 |
| EP | 0336268 B1 | 10/1989 |
| EP | 0334241 B1 | 2/1993 |
| EP | 1795828 A1 | 6/2007 |
| EP | 1985847 A1 | 10/2008 |
| ES | 2134712 A1 | 10/1999 |
| FR | 2785336 A1 | 5/2000 |
| FR | 2899651 A1 | 10/2007 |
| FR | 2901580 B1 | 7/2008 |
| GB | 1231582 | 5/1971 |
| GB | 1519774 | 8/1978 |
| GB | 2187512 A | 9/1987 |
| GB | 2269859 A | 2/1994 |
| GB | 2404227 A | 1/2005 |
| GB | 2404700 A | 2/2005 |
| GB | 2415750 A | 1/2006 |
| GB | 2447510 A | 9/2008 |
| GB | 2450917 A | 1/2009 |
| JP | 10-325387 | 5/1997 |
| JP | 2002332949 A | 11/2002 |
| JP | 2003042052 A | 2/2003 |
| JP | 2003042055 A | 2/2003 |
| JP | 2003120500 A | 4/2003 |
| JP | 2003129941 A | 5/2003 |
| JP | 2003206849 A | 7/2003 |

| | | | |
|---|---|---|---|
| JP | 2004019647 A | 1/2004 | |
| JP | 2005133545 A | 5/2005 | |
| JP | 2006046306 A | 2/2006 | |
| JP | 2006105117 A | 4/2006 | |
| JP | 2007092599 A | 4/2007 | |
| JP | 2007092600 A | 4/2007 | |
| JP | 2007107448 A | 4/2007 | |
| JP | 2007154780 A | 6/2007 | |
| JP | 2008038792 A | 2/2008 | |
| RU | 2189495 C2 | 9/2002 | |
| WO | 87/06652 A1 | 11/1987 | |
| WO | 89/09337 A1 | 10/1989 | |
| WO | 92/08050 A1 | 5/1992 | |
| WO | 02/38954 A1 | 5/2002 | |
| WO | 03/027498 A1 | 4/2003 | |
| WO | 2005/100877 A1 | 10/2005 | |
| WO | 2006/013273 A1 | 2/2006 | |
| WO | 2006/107225 A1 | 10/2006 | |
| WO | 2006/138747 A2 | 12/2006 | |
| WO | 2008/003330 A1 | 1/2008 | |
| WO | 2008/086944 A2 | 7/2008 | |

OTHER PUBLICATIONS

Ferreira, C.J.S., et al., "Unsteady Navier-Stokes 3D Simulation of Flow Around a Building with Emphasis on the Roof Top for Application on Wind Energy in the Built Environment", in the scientific proceedings of the EWEC, 2006, pp. 1-5, EAWE (Ed.), Brussels, Belgium.

Dutton, A.G., et al., "The Feasibility of Building-Mounted/Integrated Wind Turbines (BUWTs): Achieving their potential for carbon emission reductions", <http://www.eru.rl.ac.uk/pdfs/BUWT_final_v004_full.pdf>, May 2005, pp. 1-109, Energy Research Unit, CCLRC.

Müller, G., et al., "Vertical axis resistance type wind turbines for use in buildings", Renewable Energy, May 2009, 34(5):1407-1412.

Dayan, E., "Wind Energy in Buildings: Power Generation from Wind in the Urban Environment—Where it is Needed Most", reFocus, Mar./Apr. 2006, 7(2):33-38.

Quick, D., "IMPLUX: Omni-directional, vertical axis wind turbine for urban environments", http://www.gizmag.com/implux-wind-turbine/18625/, May 12, 2011, 4 pages.

* cited by examiner

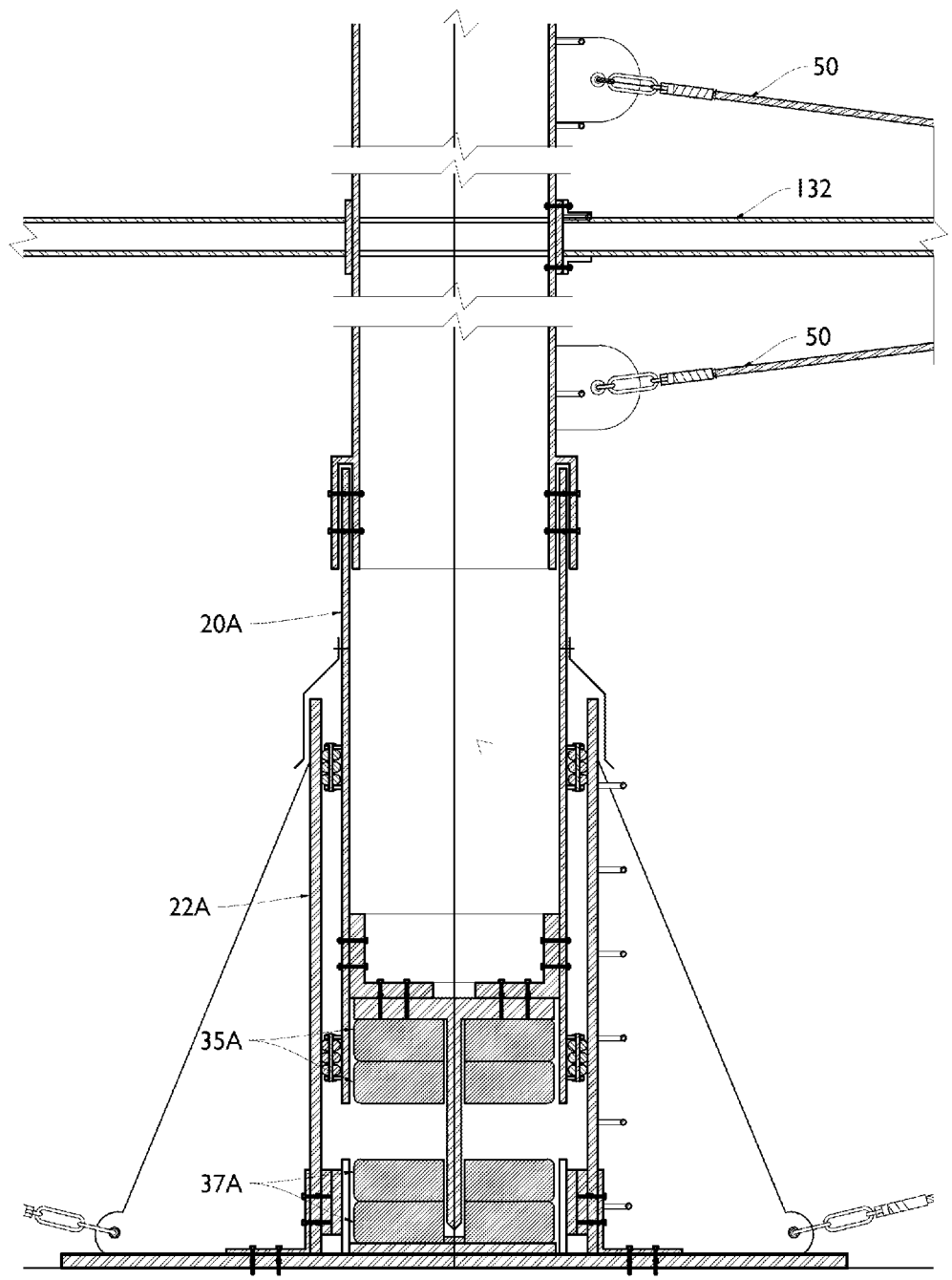

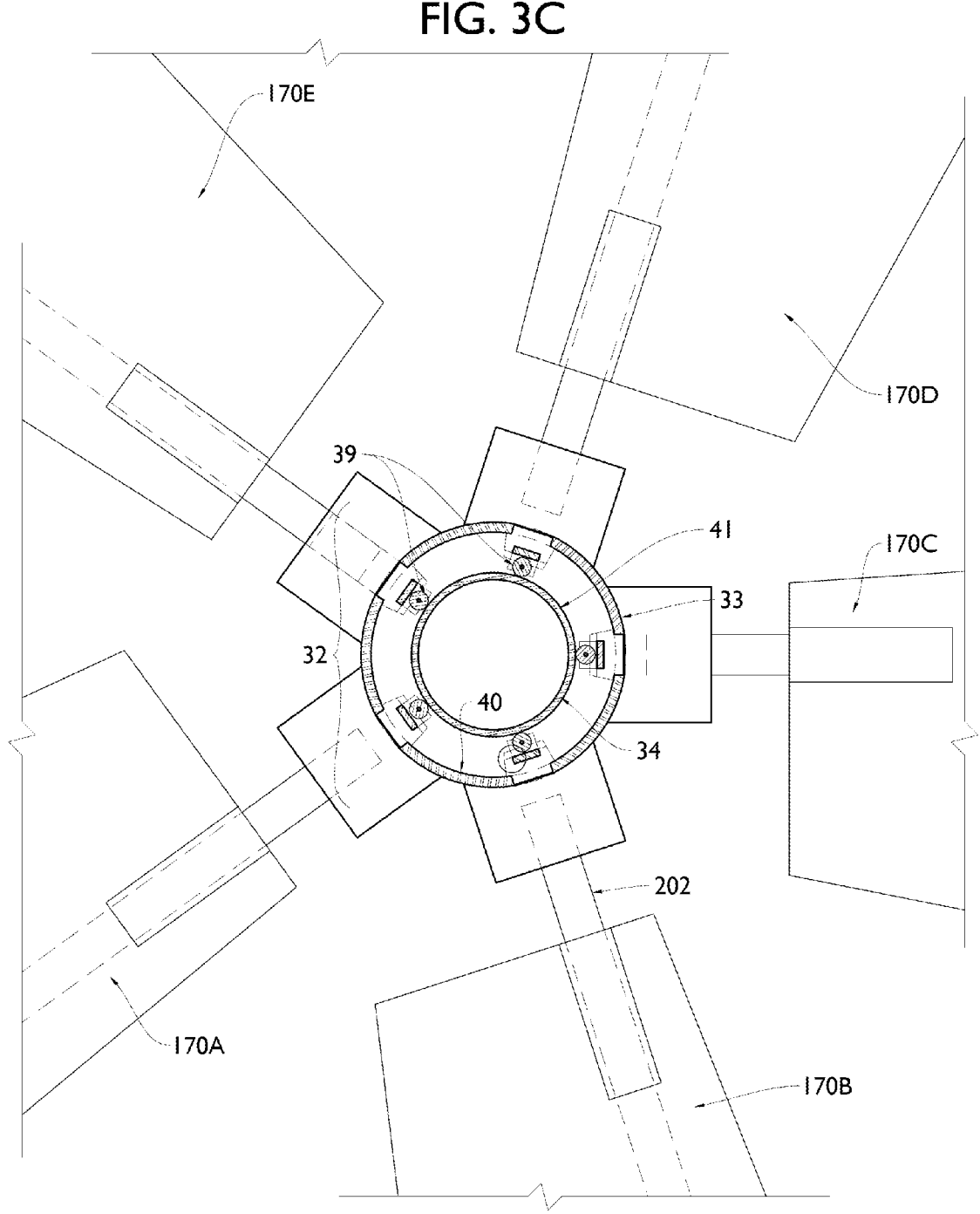

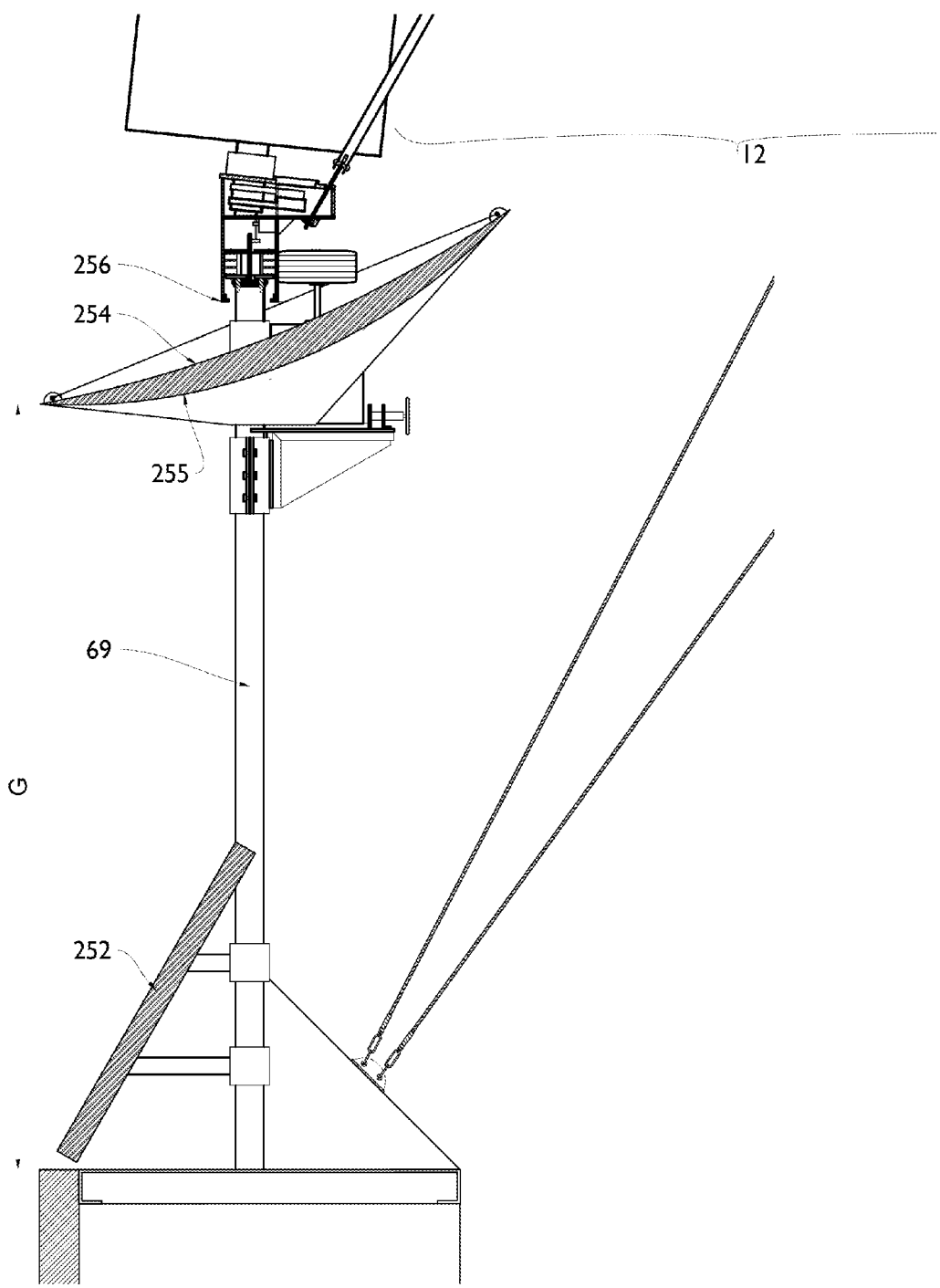

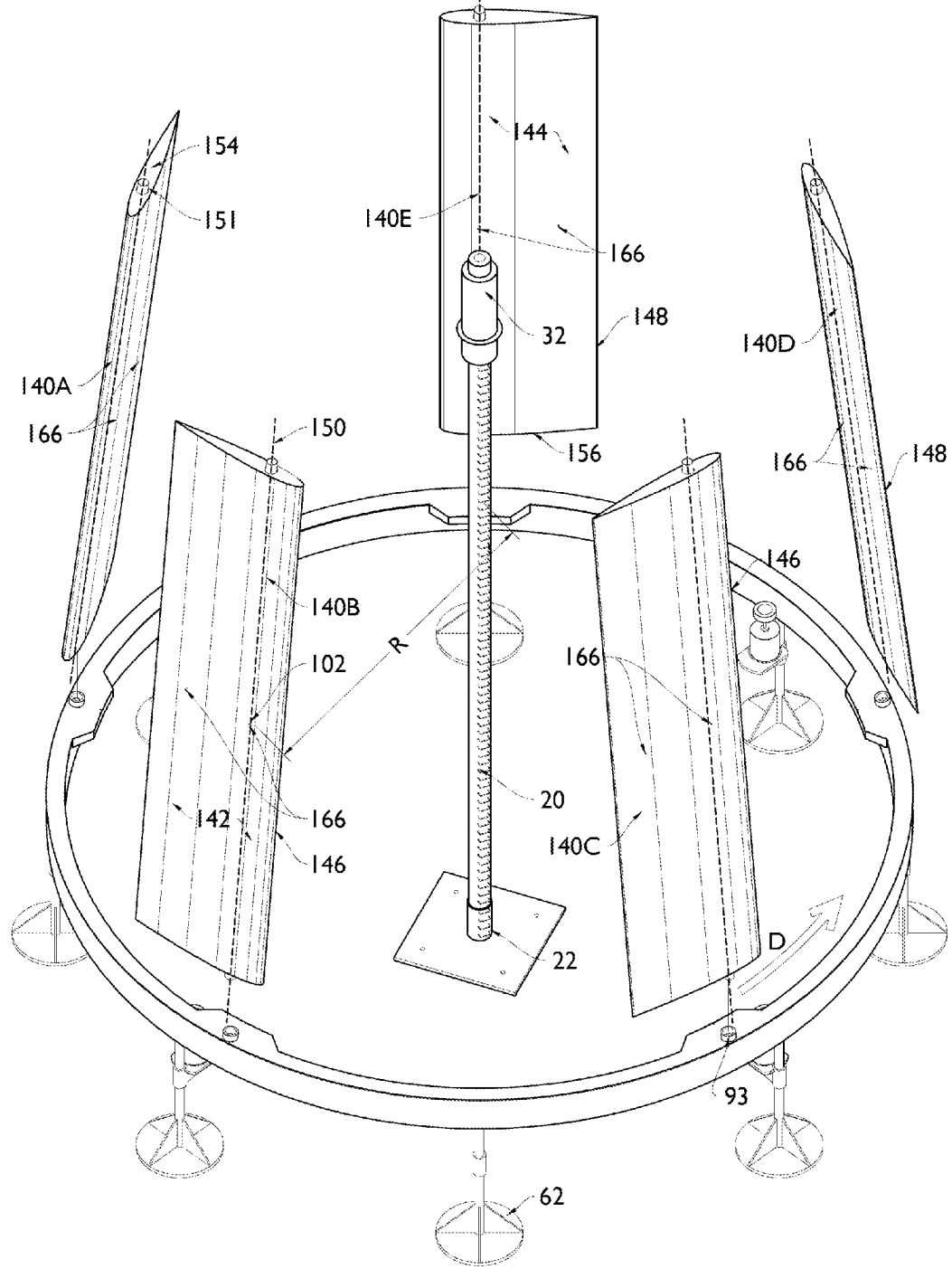

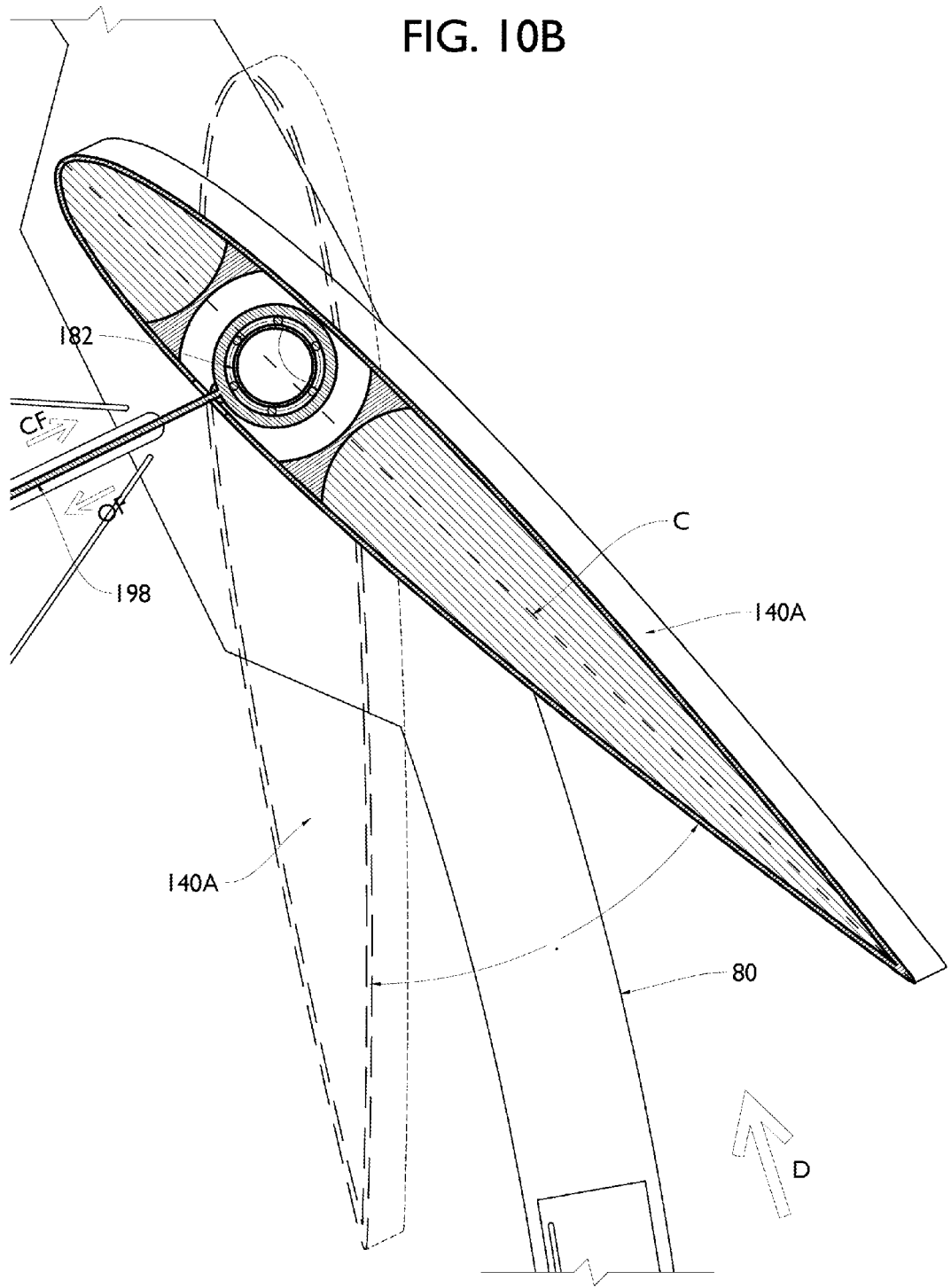

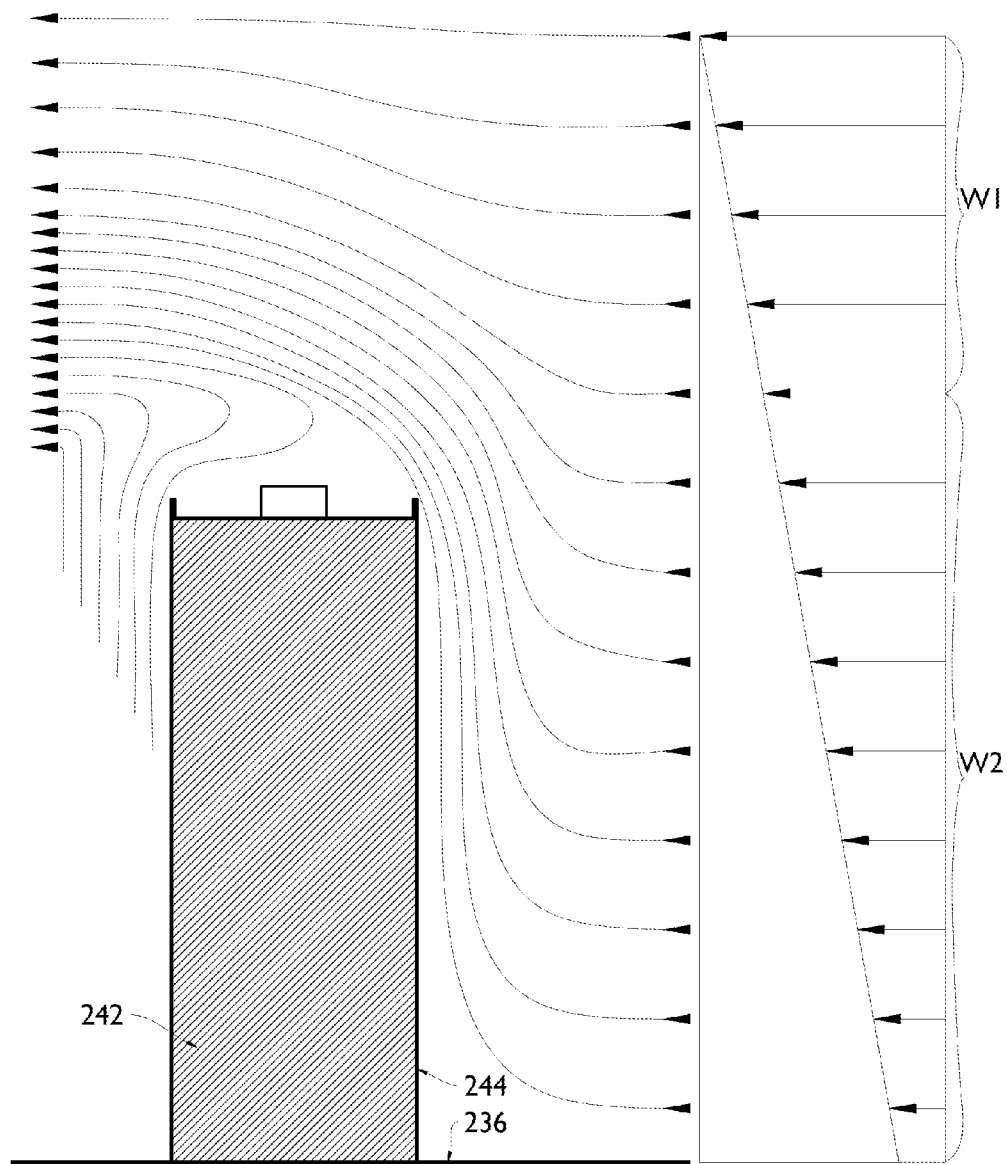

FIG. 18

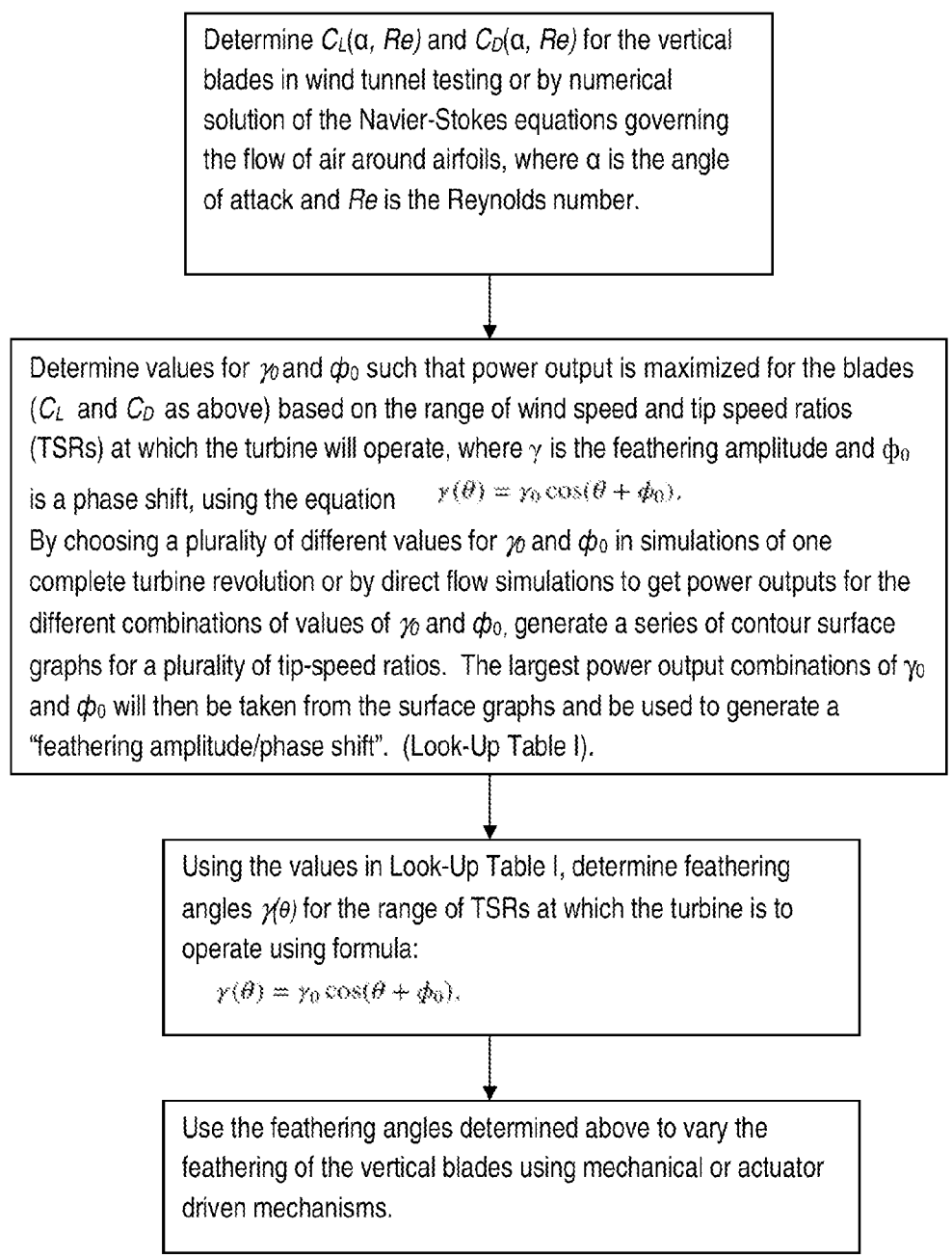

Determine $C_L(\alpha, Re)$ and $C_D(\alpha, Re)$ for the vertical blades in wind tunnel testing or by numerical solution of the Navier-Stokes equations governing the flow of air around airfoils, where $\alpha$ is the angle of attack and $Re$ is the Reynolds number.

Determine values for $\gamma_0$ and $\phi_0$ such that power output is maximized for the blades ($C_L$ and $C_D$ as above) based on the range of wind speed and tip speed ratios (TSRs) at which the turbine will operate, where $\gamma$ is the feathering amplitude and $\phi_0$ is a phase shift, using the equation $\gamma(\theta) = \gamma_0 \cos(\theta + \phi_0)$.
By choosing a plurality of different values for $\gamma_0$ and $\phi_0$ in simulations of one complete turbine revolution or by direct flow simulations to get power outputs for the different combinations of values of $\gamma_0$ and $\phi_0$, generate a series of contour surface graphs for a plurality of tip-speed ratios. The largest power output combinations of $\gamma_0$ and $\phi_0$ will then be taken from the surface graphs and be used to generate a "feathering amplitude/phase shift". (Look-Up Table I).

Using the values in Look-Up Table I, determine feathering angles $\gamma(\theta)$ for the range of TSRs at which the turbine is to operate using formula:
$\gamma(\theta) = \gamma_0 \cos(\theta + \phi_0)$.

Use the feathering angles determined above to vary the feathering of the vertical blades using mechanical or actuator driven mechanisms.

WIND ENERGY CONVERSION DEVICES

CROSS-REFERENCE TO RELATED PATENT APPLICATIONS

This patent application claims the benefit of U.S. Provisional Patent Application No. 61/295,053, filed Jan. 14, 2010.

FIELD OF THE INVENTION

This invention pertains to rotary devices that efficiently and economically convert the kinetic energy of wind into electricity in a variety of settings including in building-laden urban areas.

BACKGROUND

It is well known that we are at a point of "Peak Oil" where discovery of new sources of oil is less than the amounts being depleted. There is also growing concern over pollution produced from burning fossil fuels, especially coal to generate electricity. Concurrently, demand for electricity continues to grow across the globe. Consequently, increasing effort is being devoted to developing devices that harness renewable energy sources to generate electricity. Wind turbines are one of these.

Turbines that operate in windy environments have traditionally fallen into descriptive categories defined by their axis of revolution relative to the wind and/or the ground. Vertical axis wind turbines (VAWTs) have blades that are generally parallel to their axis of spin and perpendicular to the ground while horizontal axis wind turbines (HAWTs) have blades that are generally perpendicular to their axis of spin and parallel to the ground. The VAWT and HAWT nomenclature popularly relates to the ground plane but is not dependent upon it.

In order to successfully generate usable energy, a wind turbine must minimize mechanical energy losses while producing the maximum practical extraction of torque from the wind. Wind turbines, though they need to be strong, should be as light as possible in order to minimize energy losses due to inertia and mechanical friction. Also, since the velocity and direction of the wind varies continuously, there is a need for turbines that can harness a wide range of wind velocities and often varying wind directions with the least internal mechanical energy loss. Because wind velocity varies greatly over the course of a year, it is important that wind turbines be able to harness both low and high velocity winds. Since it is often difficult to initiate movement of such devices, there is a particular need for wind turbines that are self-starting at lower wind speeds, just as there is a need for designs that produce structural and material efficiencies that handle the stresses experienced by wind turbines when operating at higher wind speeds.

Wind turbine devices, though producers of "green" energy, also must overcome their own environmental challenges. Increasingly people are objecting to the flickering shadows and noise generation of currently produced and installed HAWT wind turbines when they are within sight and earshot of homes, businesses, places of recreation, etc. HAWT turbines also tend to create problems for birds and bats as they can be struck by the wind turbine blades, or sustain internal organ damage due to the low pressures generated near the moving blades. Therefore, there is a need for new types of installed wind turbines that are aesthetically pleasing in appearance, fit more comfortably into their environment, and do not generate low pressures in the vicinity of their moving blades.

Finally, the art has not thus far provided efficient and practical large and medium scale wind turbines that can be placed and effectively used in congested and populated locations including in urban areas filled with buildings, including skyscrapers. Further, the wind turbine industry has not developed sufficiently efficient and otherwise acceptable turbines that can be successfully erected and operated in urban areas or atop tall buildings including skyscrapers to generate significant kilowatt output. The industry also has not recognized the potential of unique air flow accessible in such environments or how to best harness them efficiently. Therefore, the increased wind power available at the heights of tall buildings and the beneficial wind flow available across the tops of such buildings have not yet been efficiently harvested.

Finally, the wind turbine industry is increasingly plagued more by the infrastructure related costs of erecting ever taller turbines and getting the electricity that they produce to market rather than by the costs of the turbines themselves. These infrastructure utilization costs include the costs of erecting free-standing towers and the costs of new or upgraded electrical distribution grids that link the wind turbines and the electricity they produce to where it is used. Distance also can create considerable transmission line losses which may be as high as 20%. Such transmission line losses could be virtually eliminated by reducing transmission distance, if acceptably designed and efficient mid- to large-size turbines were available for placement in the urban environment, particularly on the top of tall buildings. Green, renewably generated electricity is easily used within these turbine-topped buildings by tenants and building management. Placement atop tall buildings would also eliminate the costs of erecting towers to support and elevate wind turbines.

The various embodiments of the present invention overcome these difficulties and meet operational requirements and more with devices that (a) are extremely lightweight and subject to very low friction and inertial losses; (b) can accommodate a wide range of wind velocities and varying wind direction; (c) allow feathering of the wind-receiving blades of the device to maximize power output and reduce drag in the reverse wind portions of the turbines' rotation; (d) maximize the torque (power) produced through just-in-time sensing of wind conditions at the blades which enhance feathering control and optimally maximize torque extraction; (e) have a visually appropriate appearance and do not generate low pressures in the vicinity of their moving blades; (f) are generally quiet in operation; (g) start up without external assistance in low winds; (h) can harness both high and low velocity winds (and address occasionally very high winds without structural failure; (i) are designed to resist centrifugal forces on turbine components; (j) can be placed atop tall buildings where the wind benefits of height and other specific conditions can be captured; (k) capture unique air flow from building-induced updraft available at skyscrapers; and (l) may be used to supply power directly via a minimal transmission distance to the very buildings onto which they are erected thereby minimizing power transmission losses of that electricity that is generated by the turbine.

BRIEF SUMMARY OF EMBODIMENTS OF THE INVENTION

The embodiments of the present invention include wind turbines with generally vertically disposed blades evenly spaced about and parallel to the vertical axis of the device which is generally perpendicular to the ground. In preferred embodiments these wind turbines, also include additional blades that are generally radially disposed about the same vertical axis (generally parallel to the ground) and generally perpendicular to that axis. Thus, all of the turbine blades drive about the same axis though they have different orientations to it. Embodiments of the invention can be located atop high-rise buildings or on free standing towers, particularly free standing towers having solid facades on their sides preferably extending the full height of the towers, or on other supporting structures. The power generated can be used to create electricity for use on location or sold back to the electrical grid.

When both the vertically and horizontally disposed blades are present in embodiments of the invention, the device is able to capture previously uncaptured wind flow. This is particularly an advantage for urban use but can also be implemented in other environments.

Wind in its natural state, when unobstructed, flows horizontally above the ground surface. As the elevation above the ground surface increases, the wind tends to flow at a greater speed. This is important because the power that can be harvested from the wind increases to the third power as wind speed increases. Natural horizontal wind produces upward air flow at a vertical obstructing surface. The urban condition with buildings, landscape and trees tends to produce turbulence in the wind near the ground though less turbulence as the elevation increases. It is an important objective of this invention to provide a wind turbine that can be used efficiently in an elevated environment at least 50 feet and preferably at skyscraper height where higher wind speeds that are only moderately turbulent are encountered and, in preferred embodiments, that can also capture and use the building-induced air flow.

The various embodiments of the invention can be "building" mounted or "tower mounted" with the axis of the turbine generally vertical to the ground. They therefore have characteristics of a VAWT type device. Even high above the ground some turbulence remains. VAWTs are known to be less affected by turbulent wind than HAWTs. VAWTs are also known to be naturally omnidirectional and by definition always face the wind in contrast to HAWTs which must always be turned to face directly into the wind. VAWTs are therefore efficient in this respect and excellent for natural or environmental wind as no mechanical energy is used and therefore wasted in tracking the wind direction, which in urban environments is generally quite variable.

Any building (or façade-covered tower) is an obstruction to natural wind and a tall building is a large obstruction to a large cross-section of the wind. The obstruction to the wind caused by a tall building (or façade covered tower) results in large static and dynamic forces applied to the building. Tall buildings are designed to structurally resist the substantial stresses caused by obstruction of the most extreme winds expected with a significant factor of safety. The turbine is intended to operate in moderate and strong winds, but will occasionally be 'parked' in the most extreme winds which generate the highest loads on the building. In its parked position the blades will be oriented to minimize the forces on the turbine and those transmitted to the supporting building or tower. In this state the wind forces on the turbine will be small compared to those on the building as a whole, and in view of the normal conservatism and safety factors adopted in building design most existing tall buildings will be able to support turbines of embodiments of the present invention without additional structural support.

A natural reaction of obstructed wind is to seek relief. The obstructed wind does so by diverting away from the obstruction. Thus the obstructed wind escapes around corners of the building adjacent to the building facade that obstructs the wind, with a significant portion shifting to an upward vertical flow, seeking escape upwardly over the roof plane. As obstructed wind moves vertically and combines, it speeds up, especially as it hits the escape point of the roof plane where it tends to accelerate, while translating toward the horizontal. This is a "venturi-like" effect that causes increases in speed of up to about 20%. FIGS. 12A-12C are conceptual representations of such wind flow including natural horizontal wind flow W1 moving across the top of the skyscraper and natural horizontal wind W2 striking the facade 244 of the skyscraper 242. As wind flow W2 strikes the building facade it forms accelerated upward wind flow W3. Upward wind flow W3 in turn will be affected by the roof structure of the building as shown causing it to further speed up as it breaks into wind flow W4 and W5.

Embodiments of the invention capture such redirected and accelerated winds at the top of the building. For example, in turbine embodiments containing both vertically and horizontally disposed blades, the vertical wind components drive the horizontal (generally perpendicular to vertical axis) blades and the horizontal wind components drive the vertical (generally parallel to vertical axis) blades. Additionally, the horizontal components of both building obstructed and unobstructed natural winds will be captured as they combine and move past the vertical blades of the turbine. This occurs at both the upwind and downwind locations such that simultaneous driving of both the horizontal and the vertical blades can occur due to the turbine's natural three-dimensionality. Vertical components of wind are also simultaneously harvested by the horizontally positioned blades.

Natural, more traditionally flowing horizontal wind is also captured by the embodiments containing both vertically and horizontally disposed blades. As the natural, generally horizontal wind first strikes the upwind vertically disposed blades, some of it will be slowed (resulting in force on the blade and torque on the device for power extraction. Much of it, however, will attempt to escape the obstructing blades and enter, go around and go over the turbine. The wind that penetrates the turbine or moves across the upwind blades flow across the inside of the turbine and will drive into the downwind blades during the turbine's rotation. This transfers additional power to those blades and produces additional wind seeking relief. The escape route for the wind seeking relief is between the downwind blades and redirection vertically. The verticalized component is harvestable by the horizontal blades. These embodiments of the invention are therefore able to efficiently capture vertical components of the wind that are otherwise not harvested by the vertically disposed blades producing further torque via the horizontally disposed blades that additionally transfers to the same generally vertical axis.

The elements and structure of embodiments of the invention that capitalize on the described combination of natural (horizontal) and building-induced updraft with both vertically disposed and horizontally disposed blade configurations are mounted in one preferred embodiment on a suspended frame. The suspended frame design requires minimal structure to minimize the wind drag on the structure and thereby maximize the overall efficiency of the device while still resisting the stresses of turbulent and very high speed wind conditions. It comprises stiff top and bottom hoops and a system of struts and cables that together form a lightweight structurally efficient framework that ensures that the hoops operate in tandem with minimal friction and inertial losses. In tying together the upper and lower hoops, the framing elements and hoops combine to create an efficient system that is inherently stable and stress resistant through its circular shape.

In preferred embodiments that employ both vertically and horizontally disposed blades, the lightweight frame design allows the free flow of both generally horizontal natural winds as well as wind flow moving upwardly along the sides of a building and across its top. It also facilitates the vertical airflow diverted upwardly from the natural horizontal winds by the device itself as those winds strike the downwind vertical blades as the device rotates. In further embodiments of the invention, where the turbine is sufficiently spaced from the tower top and the support and circulation zone under the device, the horizontally disposed blades may be located both at the top and at the bottom of the open frame within upper and lower hoops of the frame.

The frame structure that supports the blades preferably will be gravity-supported on a hub mounted on a vertical mast. Magnetic levitation bearings or other types of bearings can be used to rotatably support the hub on the mast. In one preferred support arrangement, the hub concentrates the entire gravity weight of the fully assembled frame on the vertical mast. Thus, in this support arrangement of the invention, when the turbine is mounted to a building roof, it efficiently transfers gravity loads and portions of the lateral loads of the turbine to the building through the mast. Other support arrangements may employ the entire primary vertical axis (mast) rather than the top mounted hub as a rotational element of the device. The hub in the first support arrangement transfers some lateral loads into the mast, and the spinning lower hoop translates the remainder of any lateral loads into its base. The spinning mast support arrangement transfers vertical gravity loads and lateral loads to the base through both the base of the mast and the lower hoop. The first stationary mast support arrangement has a lower hoop with lateral but no gravity/vertical component, and the second has lateral and gravity/vertical components.

Also, the frame design provides a generally balanced condition especially when spinning, with its rigid circular hoops resisting laterally transferring stresses. In the first support arrangement, the lower hoop preferably will run along a fixed guideway that receives a portion of the horizontal lateral forces from the frame but avoids gravity loading. The guideway may be fixed to the roof of a skyscraper or other building (or to a free-standing tower) so that it can gently disperse some horizontal lateral forces to the building across a large area while stabilizing the entire assembly. The guideway may include a wing-shaped deflector surface that streamlines some of the building updrafts and directs them internally through the frame structure toward the upper horizontal blades to assist in the capture of that wind component for beneficial harvesting of additional wind power by the device.

The lower hoop preferably will sit above the guideway so that it does not bear on the guideway, allowing all members supporting the lower hoop to be stressed into tension, enabling them to be generally smaller and thereby lighter than if gravity bearing and in compression. The guideway preferably also will be free of the hoop in the vertical direction by a variable dimension in order to accommodate temperature and other stress deformations that can produce a variety of vertical displacements without causing added friction or vertical gravity bearing at the location of the lower hoop. In other words, since the lower hoop does not actually rest on the circular guideway, it is free to move upwardly and downwardly in response to temperature and stress-related material expansion/contraction in the elements that make up the fully assembled frame structure as it rotates. In this way, the lower hoop and therefore the vertical blades of the turbine are kept firmly in place with minimal frictional losses. The structure acts like a "lamp shade" that is supported at the midpoint of its top. The hoops at top and bottom act like the hoops in a hoopskirt to maintain its circular shape. The lower guideway prevents "swaying" of the hoopskirt, but allows it to spin freely. The "X" braced cable assembly ensures that the hoops rotate in tandem but is nearly transparent (non-obstructing) to wind flow moving into and through the turbine.

The frame structure with its vertical blades preferably will be a modestly truncated conical shape although it may also be cylindrically shaped. It may also be an inverted truncated conical shape. The angle of truncation may vary by 12° to the vertical in both directions. The open frame design produces an efficient transfer of all forces on the extremely lightweight frame structure to the vertical mast. The rotary movement of the lower hoop is constrained by the circular guideway or in the other embodiments via the tire-like supports that may drive electricity generating units. The rotation of the top hoop is linked by the open frame's triangulated structural tube to the lower hoop so that each hoop moves in tandem with the other. The turbine frame is thus restrained by the hub at the top of a vertical mast and further restrained by the lower hoop and the circular guideway, but tied together as one via the open system of rods and cables that make up the device's frame.

A key force that is also restrained and made less problematic in embodiments of the invention is the centrifugal force that results from the spin of the turbine. The primary components that receive the most stress are the vertical blades. These blades are stressed by the wind forces and further stressed by the centrifugal forces of rotation. An embodiment of the invention reduces the effect of these forces by bracing the rotatable vertical blades such that they tie into the central bracing structure in order to prevent outward deflection of the blade caused by these forces. The bracing ties the pivot rod of the blade, for example, at approximately the one third and two third height points to reduce the unbraced length of the blade but still allow rotation. This further reduces the overall device weight and allows the blades to perform in an unhindered and efficient fashion.

As the device operates in the wind, the edges or faces of the spinning lower hoop may directly drive one or multiple conventional generator packages to produce electrical power on-site. Although it is currently preferred that the electricity will be generated using the edges or faces of the lower hoop of the open frame to drive the generator package, the turbine may be configured to engage other rotating surfaces or the rotating hub at the top of the vertical mast.

Rotatable vertical blades are mounted between the upper and lower hoops. The upper and in some embodiments, the lower hoop of the open frame of embodiments of the present invention preferably will also carry horizontally disposed blades that receive a portion of winds flowing up along the sides of the building below and the redirected portions of the natural horizontal wind that will also drive the turbine. A minimum of three horizontally disposed and three vertically disposed blades will be used. Currently, it is contemplated that about five horizontally disposed blades and about five vertically disposed blades will be used. All of the blades should be rotatable about their long axes. The vertical blades and also the horizontal blades may be controlled by motor(s) or actuators or other mechanical devices powered by the rotation of the device. Small generators driven by the main turbine can also supply power to batteries for the actuators/motors that would drive rotation of the blades per the direction of the TSR algorithm database for the turbine.

Horizontal wind capture will be maximized in embodiments of the present invention with vertical blades that are adapted to instantaneously adjust their position relative to the wind and speed direction as the device rotates about is vertical axis in order to maximize the torque produced.

Vertical wind captured will be maximized in embodiments of the invention with horizontal blades that are adapted to instantaneously adjust their position relative to the wind speed and direction as the device rotates about its vertical axis in order to maximize the torque produced. As already noted, in a preferred embodiment both horizontal and vertical wind capture will be achieved by vertical and horizontal blades, respectively.

The degree of rotation for each individual blade is different from each of the others at any particular time and location about the radius of the turbine. Each instantaneous location may be determined by empirical and mathematical algorithms to produce blade rotation and feathering that maximizes the torque produced as the blades turn in the wind. The controlling algorithm would optimize the torque at each blade for each instantaneously measured wind speed, turbine location, wind direction and other pertinent local variables.

A key element of the algorithms and the database produced for each turbine location will be the careful monitoring of the tip speed ratio of the blades of the operating turbine so that torque production is optimized. The controlling algorithm will also allow for other blade angles that will achieve turbine start up in low winds and turbine braking in high winds to prevent excessive rotation speeds that exceed device structural capacities and government safety regulations. Manual brakes and locks may also be present to restrain rotation to accommodate repair and maintenance schedules for the turbine.

The device controls vertical blade feathering angles at any rotational angle through an algorithm that optimizes the torque of the device for any given wind speed and turbine rpm. The rpm is independently optimized in order to achieve and maintain an optimal tip-speed ratio (TSR). For very high wind speeds, the TSR may be reduced in order to limit turbine RPM. For each operating point of the turbine as defined by its TSR, blade feathering angles are optimized to extract maximum torque from the wind striking and moving across the open frame. This control instantaneously optimizes power production, and can also be used to limit rotational speed, as well as achieve auto-startup of the turbine. The blade feathering angle control also allows the turbine to instantaneously adapt to the fluctuating wind velocities typical for atmospheric conditions encountered by the device. The control system will also be designed to prevent the device operating (except transiently) at any rotational speeds which might cause the dynamic forces to excite critical natural modes of vibration of the building into resonance.

Blade Angle Control I

Blade Angle Control I is a preferred algorithm for achieving instantaneous blade angle control of the vertical turbine blades. Due to the circular motion of the blades relative to the oncoming wind, the blades experience an angle of attack of the air relative to the chord line of the blades "C" (shown in FIG. 10B) that varies periodically. Measuring the azimuthal position angle $\theta$, counter-clockwise relative to the backward-facing position of the blade arm, then the downwind angle $\beta$ (measured in the same way as $\theta$) of the air flow experienced by the blade when moving in the clockwise direction is given by $$\beta(\theta) = \beta(\theta) = -\arctan\left[\frac{TSR\cos(\theta)}{1 + TSR\sin(\theta)}\right], \quad (1)$$

where TSR denotes the global tip-speed ratio which is the ratio of the speed of the tips of the blades to the velocity of the wind well upstream of the device.

$$TSR = \frac{\omega R}{U_\infty}. \quad (2)$$

Here, $\omega$ is the angular speed of the wind turbine, R its radius, and $U_\infty$ the wind speed at a distance from the turbine where the flow velocity is not significantly affected by the presence of the turbine. For example, the wind speed may be measured at a distance of about 1-2 turbine diameters. Below, we will also make use of the concept of a local tip-speed ratio T*, defined as $$TSR^* = \frac{\omega R}{U}, \quad (3)$$

where U is now the local free-stream velocity experienced by the blade at its instantaneous location. This local velocity is different from $U_\infty$ due to the fact that the operating turbine slows down the velocity of the wind in its vicinity. Calculations using the algorithm take into account the fact that this reduction of wind speed will, in general, be different at each angular position of the blade. In particular, a turbine blade will experience slower velocities for angles of $-\pi/2<\theta<\pi/2$, corresponding to a blade position in the leeward-facing half of the turbine, compared to the velocities experienced, during the windward half of its cycle.

FIG. 13A shows the angle-of-attack variation $\alpha_0(\theta)$, $$\alpha_0(\theta) = \frac{\pi}{2} + \beta(\theta) - \theta, \quad (4)$$

that a blade mounted at a right angle to a radial turbine arm would experience, as a function of the rotational angle $\theta$ relative to the wind direction. $\alpha_0$ is defined positive if the relative velocity of the airflow experienced by the blade has a component pointing radially outward, away from the rotational axis of the turbine.

In general, airfoils can only generate significant amounts of lift up to a certain maximum angle of attack, known as the "stall angle" $\alpha_S$. Above this angle, flow separation occurs, which is accompanied by a break-down of lift, and a very significant increase in drag. The airfoils that are used to generate lift forces have typical stall angles $\alpha_S<15°$, so with reference to FIG. 13A, at the tip-speed ratios we are aiming for (TSR<2.5), the fixed tangential blade experiences angles of attack well in excess of the maximum angle of attack at which airfoils can operate efficiently, which means that the airfoils of such a wind turbine would operate in a stalled condition for a significant part of their cycle of revolution.

For regular (not stalled) flow conditions, the lift and drag forces are functions of the angle of attack of the air relative to the airfoil. The exact dependency of lift and drag forces on angle of attack has to be determined experimentally or by numerical simulation, and depends both on the airfoil shape and on the Reynolds number. These relationships are conventionally expressed in terms of the lift and drag coefficients, $C_L$ and $C_D$, respectively, defined via $$C_L = \frac{L}{\frac{\rho}{2}SV^2}, C_D = \frac{D}{\frac{\rho}{2}SV^2}, \quad (5)$$

with L and D the lift and drag forces, respectively, $\rho$ the density of the air, S the planform area of the blades, and V the velocity of the air relative to the moving blades. Taking the vector product of the force vector F with the radius vector of the turbine arm, one can calculate the torque T that each turbine blade generates. This torque will thus be a function of the wind speed $U_\infty$, local tip-speed ratio TSR*, angle of attack of the blade $\alpha$ and of the rotational angle $\theta$, so we have T=T($U_\infty$, TSR*, $\alpha$, $\theta$). It is important to note that, unless the angle of attack $\alpha$ is chosen judiciously, this torque will be negative (against the direction of rotation of the turbine), and that, for each set of the parameters given above, there is an optimal angle of attack at each position of the blade during its rotation such that the positive (driving) torque is maximized.

If the lift and drag coefficients $C_L(\alpha)$ and $C_D(\alpha)$ for given operating conditions of the turbine (wind speed and tip-speed ratio) are known, an optimal angle of attack a can be determined by numerical optimization. The optimal angle of attack for a given local tip-speed ratio TSR* shows only weak dependence on the position of the blade in each half-cycle of the turbine, which means that for optimal power output, the turbine blades should be controlled in such a way that they are at an almost constant absolute angle of attack relative to the oncoming flow velocity they experience. This angle of attack needs to change sign at the ±90°-positions of the turbine arm in such a way that the resulting lift vector of the turbine blades has a component pointing towards the rear, leeward side of the turbine. An example of the resulting blade angles of attack is shown in FIG. 13B. In order to achieve the angles of attack shown in FIG. 13B, the turbine blades need to be feathered at angles that vary throughout the rotation of the turbine. The feathering angles required to achieve the angles of attack given in FIG. 13B are shown in FIG. 13C. In FIG. 13C the feathering angle y is defined positive for a rotation of the airfoil such that its leading edge is pointing outwards, away from the axis of the turbine.

At lower tip-speed ratios (e.g. TSR<1.5) a greater variation on angle of attack is necessary to maximize the driving torque. It is clear that the achievement of optimal angles of attack would require abrupt motions of the turbine blades at the ±90°-positions of the turbine arm that are not practical, since they would require large forces, and enforcing the motions would consume significant power. In our design, these abrupt changes in angle of attack will be smoothed out. We note, however, that the torque provided by the blade of the turbine near these positions will always be small (see FIG. 13D), so that the necessary deviation from the optimal angles of attack will only have a minor effect on the power output of the turbine.

Adjustments of the blade feathering angles of the turbine may thus be carried out as follows:

The relationships for $C_L(\alpha, Re)$ and $C_D(\alpha, Re)$ for selected blade sections are determined through single-blade tests in wind tunnel experiments, or by numerical solution of the Navier-Stokes equations governing the flow of air around the airfoils.

Optimal theoretical feathering angles at each position (relative to the incident wind direction) of each blade are determined for the range of tip-speed ratios for which the device will operate. The optimal practical feathering angles will be based upon the theoretical values but adjusted to optimize the overall power output (accounting for the local wind deceleration due to energy extraction using, for example, the stream tube approximation, and the energy that must be expended in feathering the blades) and to minimize the effects of excessive feathering forces on structural and mechanical design. In order to do so, the power output of the turbine over a full revolution is determined as a function of a set of practical feathering angles. This set of angles is optimized to maximize the net power output.

In one embodiment of our turbine, each of the blades will be equipped with velocity sensors that can determine instantaneous airspeed and velocity for each blade, a short distance ahead of the blade. This can be done using, for example, hot-wire or pitot probes 164 mounted on stakes 162 protruding ahead of the blade as shown, for example, in FIGS. 1A and 10.

Another embodiment of our turbine may use sets of at least two pressure sensors 166 mounted on the front and back of the turbine blades themselves, as shown, for example, in FIG. 11. By combining information from several pressure sensors mounted on both sides of the airfoil, it is possible to determine both angle of attack and velocity of the airflow experienced by a turbine blade. By using information from sensors of a preceding blade, the wind conditions that will be encountered by the following blade can be predicted, simplifying the design, and improving the performance of an appropriate control algorithm.

A control algorithm will be implemented which, based on instantaneous readings of the above sensors, determines optimal feathering angles in order to follow a smoothed relationship analogous to the one given in FIG. 3.

The controller sends appropriate signals to actuators on each turbine blade that adjust the feathering angles accordingly.

Blade Angle Control II

In an alternative embodiment, optimal feathering angles as represented for a particular example in FIG. 13C can be approximated by a sinusoidal function. This means feathering angles follow a relationship of the form $$\gamma(\theta) = \gamma_0 \cos(\theta + \phi_0), \quad (6)$$

where $\gamma_0$ is the feathering amplitude, and $\phi_0$ is a phase shift. For this embodiment, the parameters $\gamma_0$ and $\phi_0$ are determined by directly optimizing the power output of a turbine using the feathering angles given by equation (6). In order to do so, the power output of the turbine over a full revolution is determined as a function of $\gamma_0$ and $\phi_0$ using, for example, the stream tube approximation. Values for $\gamma_0$ and $\phi_0$ are then determined such that this power output is maximized. In general, these optimal values will depend on wind speed and tip-speed ratio. The advantage of this approach is that one need only to determine one representative wind speed and direction for the turbine, which can be measured by a single sensor, in addition to the turbine speed in order to determine tip-speed ratio. Control of the blade feathering angles can then be carried out through mechanical means or with an electrically powered actuator.

For this embodiment, the blade feathering angles of the turbine are adjusted as follows:

The relationships for $C_L(\alpha, Re)$ and $C_D(\alpha, Re)$ for selected blade sections are determined through single-blade tests in wind tunnel experiments, or by numerical solution of the Navier-Stokes equations governing the flow of air around the airfoils.

Based on the data from either experiments or simulation, the power output of a turbine using the feathering angles given by equation (6) is determined.

By numerical optimization, we determine values for $\gamma_0$ and $\phi_0$ are determined such that this power output is maximized. The optimal parameters will depend on wind speed and tip-speed ratio.

In one embodiment, the turbine will be equipped with velocity sensors that determine instantaneous direction and speed of the wind. A pitot probe is suitable for this purpose, but other sensors capable of determining direction and magnitude of the wind speed may be used.

A control algorithm will be implemented which, based on the instantaneous readings of the above sensors, determines optimal parameters for amplitude and phase of our eccentric control device.

The controller sends appropriate signals to actuators that control the parameters $\gamma_0$ and $\phi_0$ angle of the blades.

Feathering techniques either similar to those described above or other feathering techniques already available in the art may be used in the practice of this invention.

Measurements

Instantaneous air flow measurements may be obtained by locating hot-wire or pitot probes 164 on stakes 162 with the tip of the tube about one blade cord length ahead of each blade, as illustrated in FIG. 1A. The instantaneous flow velocity vectors from the measured flow velocities and flow directions can be determined using known conventional techniques from the data produced by the hot-wire or pitot probes on each blade. Using this data, the blade angles can be controlled as set forth below for each blade for the instant that the blade reaches the location of the tube tip based on the instantaneous flow velocity vectors to determine and implement optimal feathering angles of the blade.

Alternatively, pressure sensors 166 such as piezo-electric pressure sensors, pitot static sensors, LIDAR or SODAR sensors 166, can be mounted on the front and the back of each of the blades. This is illustrated in FIG. 11. There must be at least one sensor on each side of each blade, but preferably there it will be two or more sensors on each side. From these pressures the instantaneous flow velocity vector can be determined using conventional techniques. This flow velocity vector can be used to predict the feathering necessary for the next-following blade.

The above instantaneous flow determination techniques are illustrated in FIG. 16.

The Blade Angle Control I technique described above is illustrated in FIG. 17.

LOOK-UP TABLE I

| TSR | $\gamma_0$ | $\phi_0$ |
|---|---|---|
| • | • | • |
| • | • | • |
| • | • | • |

The Blade Angle Control II technique described above is illustrated in FIG. 18. The implementation of this technique requires the placement of a plurality of wind direction and speed detectors spaced from the turbine.

LOOK-UP TABLE II

| For each selected TSR: | |
|---|---|
| θ | α |
| $\theta_1$ | • |
| $\theta_2$ | • |
| $\theta_3$ | • |
| $\theta_4$ | • |

FIG. 13 diagrammatically illustrates one set of feathering angles for vertical blades 140A-140E at a TSR of 1.5. Thus, in this figure there is a horizontal wind blowing in direction D1. Blade 140A is feathered at 216 degrees with respect to the wind direction, blade 140B is feathered at 288 degrees, blade 140C is feathered at 0 degrees, blade 140D is feathered at 72 degrees and blade 140E is feathered at 144 degrees.

FIG. 14A diagrammatically illustrates feathering angle variations when TSR is altered. Thus, FIG. 15A shows the position of blade 140A at TSR=1.5. FIG. 15C shows the position of the blade at TSR=2.0. FIG. 15C shows the position of the blade at TSR=2.5. Finally, FIG. 15D shows the position of the blade at TSR=3.0.

BRIEF DESCRIPTION OF THE DRAWINGS

In order to aid in understanding the invention, it will now be described in connection with exemplary embodiments thereof with reference to the accompanying drawings in which like numerical designations will be given to like features with reference to the accompanying drawings wherein:

FIG. 1F is a partial sectional view of the lower area of the rotatable mast and associated supports, bearings and cabling of the embodiment of FIG. 1A;

FIG. 3C is top plan view of the hub assembly of the embodiment of FIG. 1;

FIG. 5C is a partial view of primary and secondary wind flow deflectors mounted to the support rods of the piers holding the guideway of the embodiment of FIG. 1 in place;

FIG. 10 is a partial axonometric view of the embodiment of FIG. 1 showing the generally vertically disposed blades juxtaposed above their attachment points on the lower hoop;

FIG. 10B is a partial cross sectional view of the centrifugal force resisting features of the FIG. 10A;

FIGS. 12A-12C are conceptual drawings showing wind flow adjacent a tall building and against and within a wind turbine in accordance with embodiments of the present invention;

FIG. 18 is a flow chart illustrating the Blade Angle Control II technique.

DETAILED DESCRIPTION OF THE INVENTION

Figure 1:
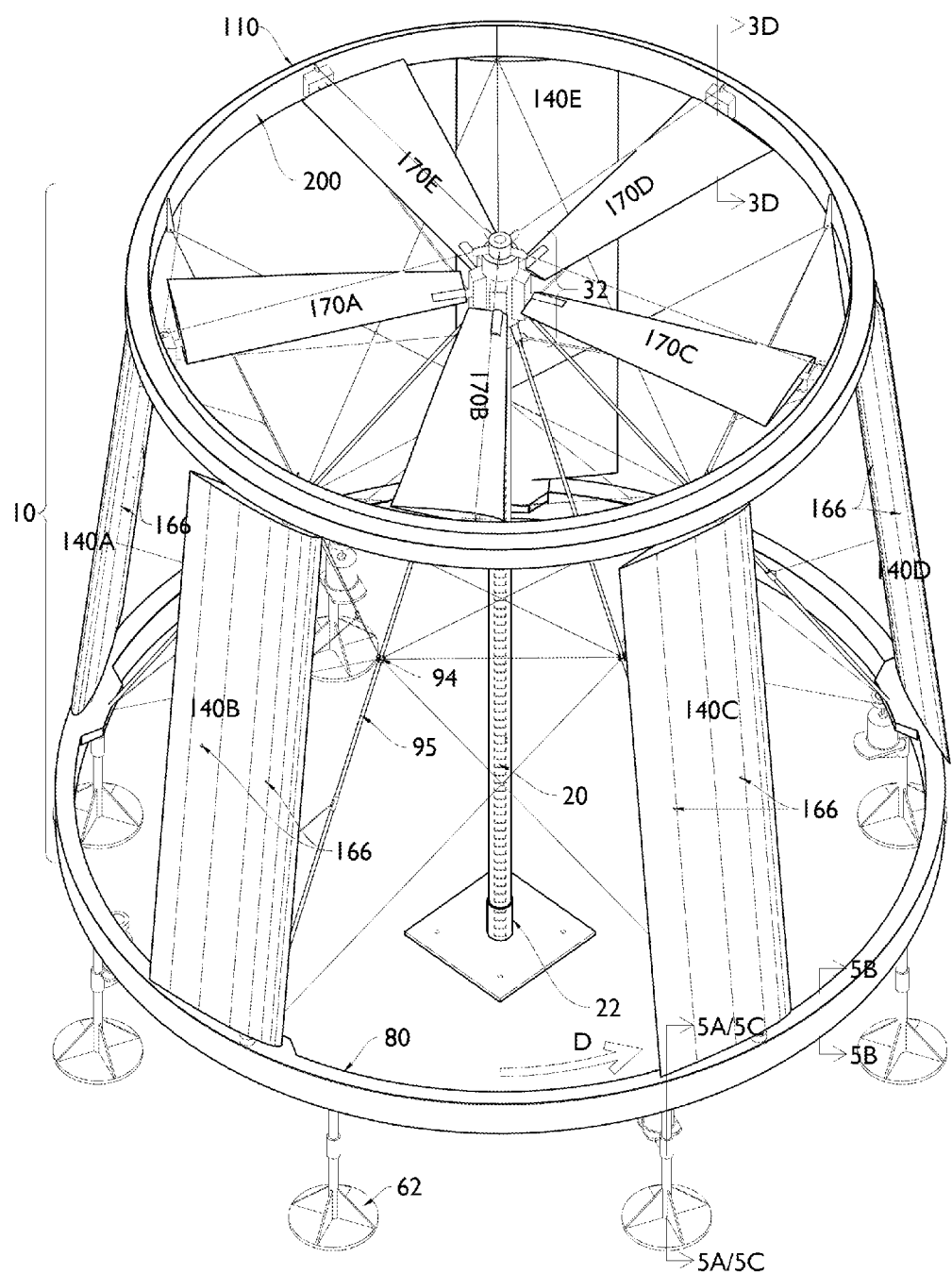
FIG. 1 is an axonometric view of one embodiment of the invention.
Figure 1A:
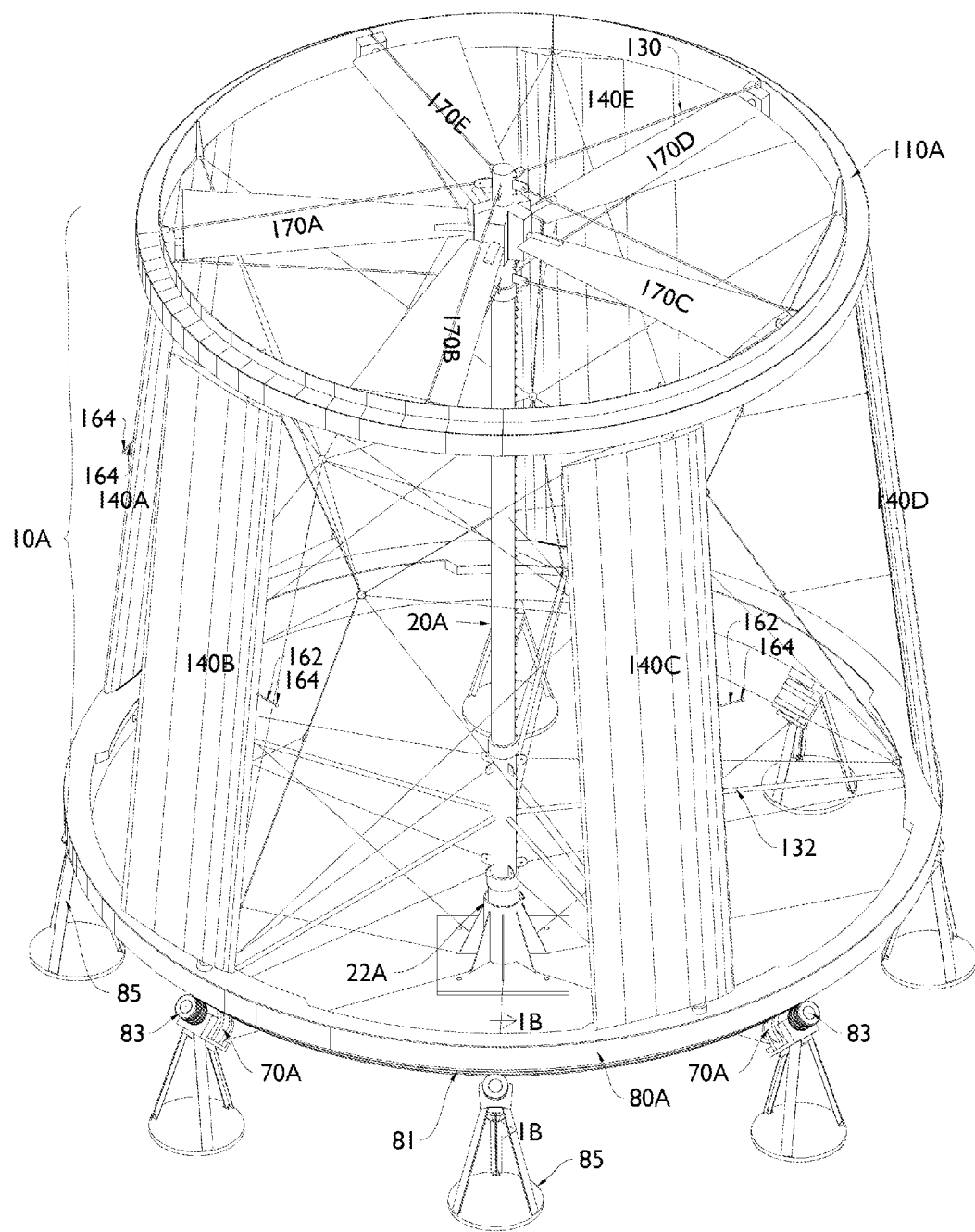
FIG. 1A is axonometric view of another embodiment of the invention.
Figure 2:
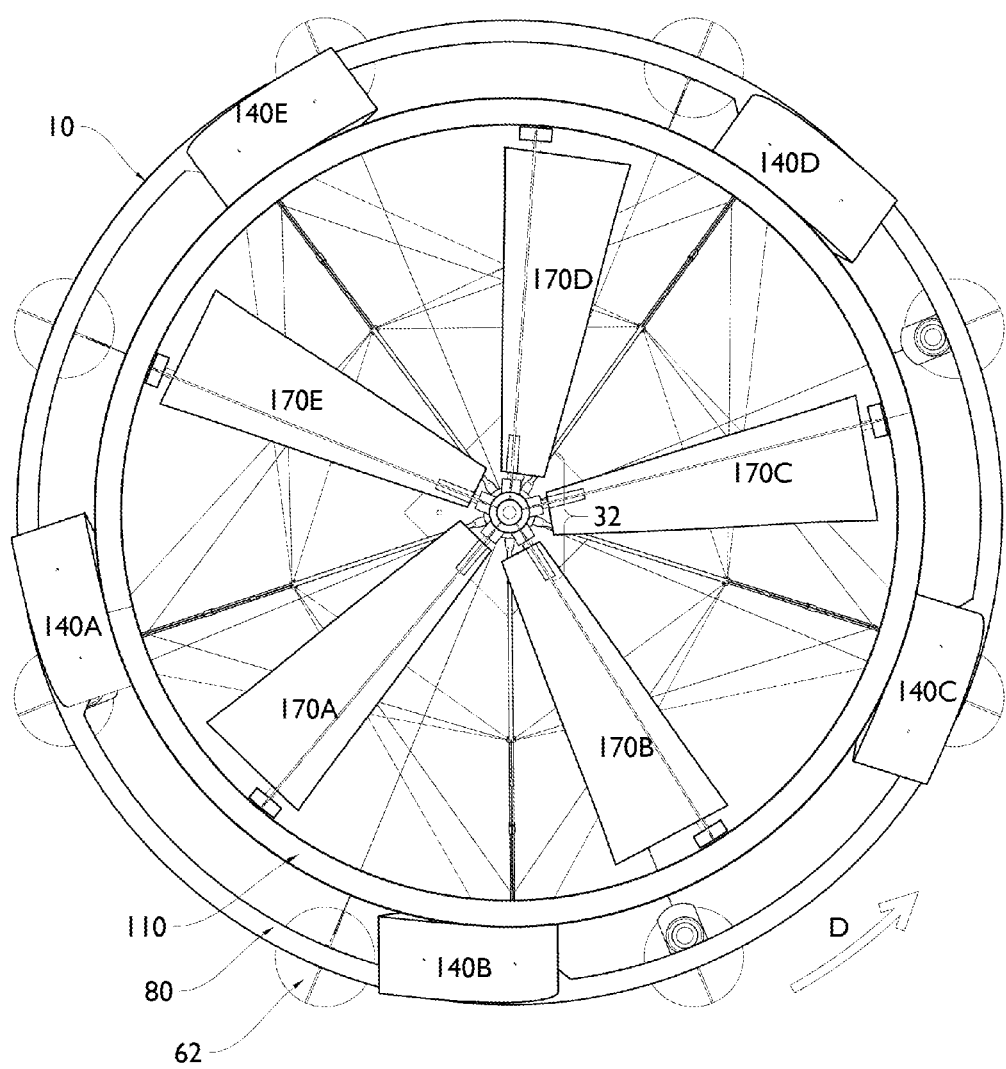
FIG. 2 is a top plan view of the embodiment of FIG. 1.

Turning first to FIGS. 1 and 2, an open frame structure 10 is shown hung from a vertical mast 20 that will be described in more detail below. The frame structure includes a circular lower hoop 80 and a circular upper hoop 110. Lower hoop 80 is positioned above a guideway 60 (FIG. 4) that is supported by a series of piers 62 disposed about the circumference of the guideway.

Although five vertical blades 140A-140E are shown evenly spaced about the circumference of the frame structure supported on the lower hoop, as currently preferred, a minimum of three such blades may be used. Also, although five optional horizontal blades 170A-170E are shown radially disposed within upper hoop 110, as currently preferred, a minimum of three such blades may be used. Also, although the frame structure is indicated to rotate in a counterclockwise direction "D", it can be arranged to rotate in a clockwise direction as well. The internal area of the frame encompassed by the vertical blades is the central passage 12 of the frame.

Figure 3:
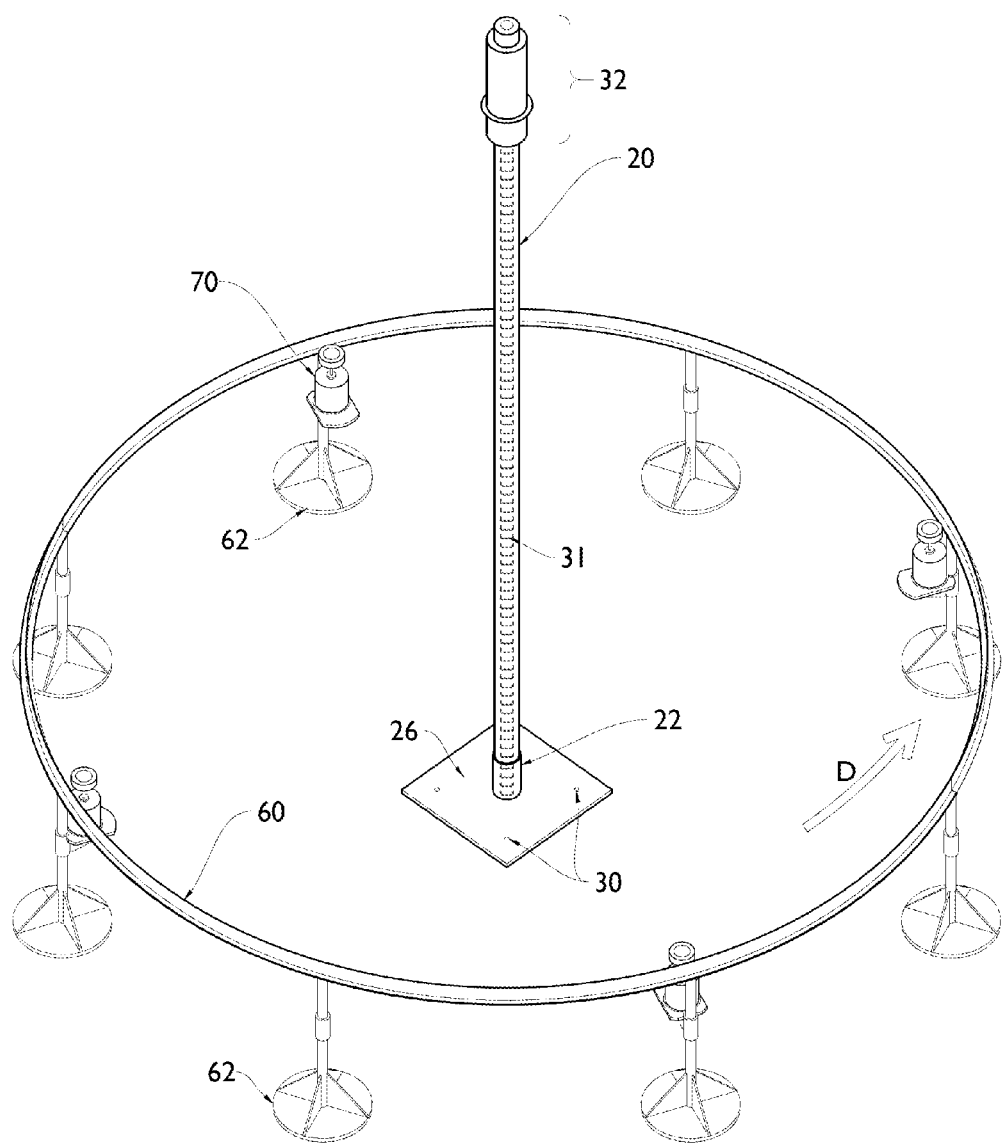
FIG. 3 is an axonometric view of the guide rail and vertical mast of the embodiment of FIGS. 1 and 2.
Figure 3A:
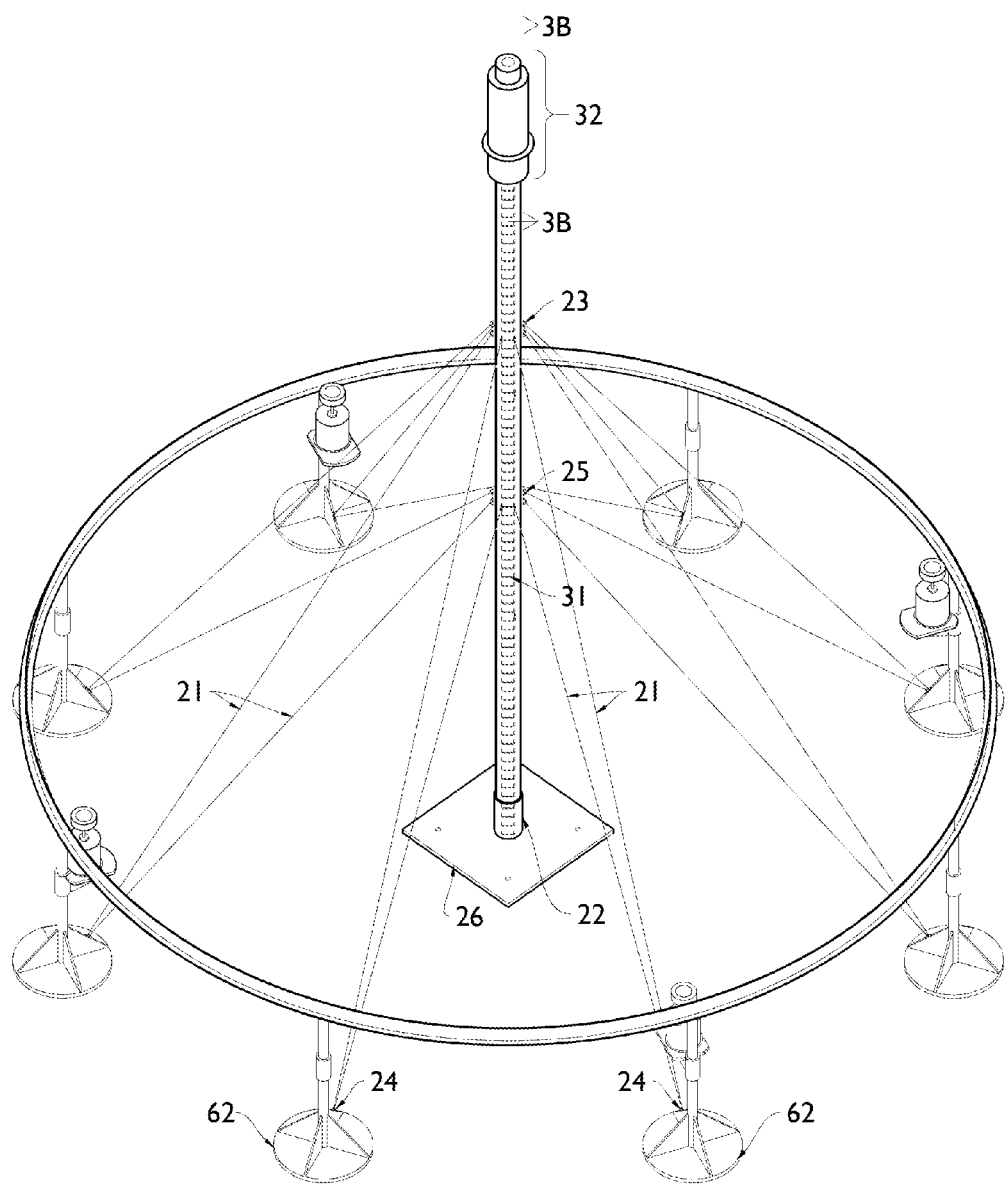
FIG. 3A is an axonometric view of the mast support cabling of the embodiment of FIG. 1.

Turning now to FIG. 3, vertical mast 20 is shown fixed and mounted in a mast base 22. The mast may include ladder rungs 31 to provide access to the top of the mast for maintenance and repair purposes. The mast preferably will be braced by appropriate mast support cabling running from near the top of the mast. As seen in FIG. 3A, such mast support cabling 21 is attached at its distal end about the mast at locations 23 and 25 and extends at its proximal end to cable attachment eyelets 24 on each of the piers. Of course, if desired, the proximal ends of the cables can be attached to other appropriate non-rotatable structures. This mast support cabling helps vertically brace the mast allowing its unbraced length to be reduced and its structural requirements lessened. As a result, the weight of the entire structure is reduced.

While the mast base may be of any appropriate design, in the illustrated embodiment it includes a flat bottom plate 26 supporting a central member 28 into which the mast is fixed and mounted. Bottom plate 26 also includes holes 30 to receive fasteners (not shown) for attaching base 22 to a roof deck, a tower, or to other supporting surfaces or structures.

Mast 20 carries the gravity load of the turbine and frame 10 of the illustrated embodiment of the invention to receive and resist portions of the lateral forces experienced by the frame. The mast may be of any appropriate length. It also may taper upwardly from the base of the mast. For example, in one embodiment the mast may be about 80 feet tall to accommodate a frame having a height of about 60 feet leaving a clearance spacing of about 20 feet under the bottom of the frame. The clearance spacing should have sufficient vertical height to provide a gap to admit air flow moving across the wall-two-roof transition point (or "edge" of the roof) to the center of the open frame of the turbine.

Figure 3B:
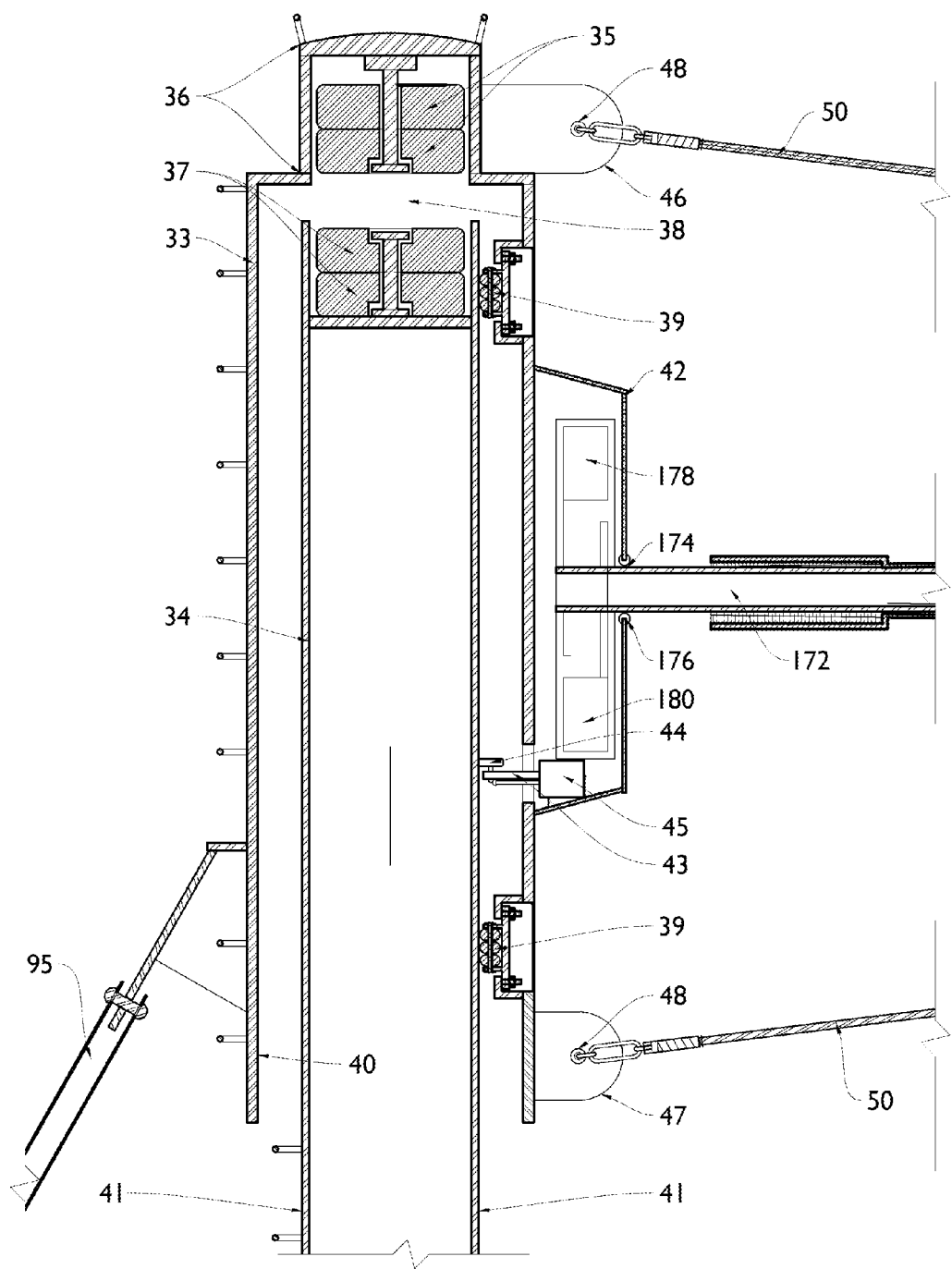
FIG. 3B is a partial cutaway elevation view of the hub of the device mounted at the top of the mast of the embodiment of FIG. 1.
Figure 3D:
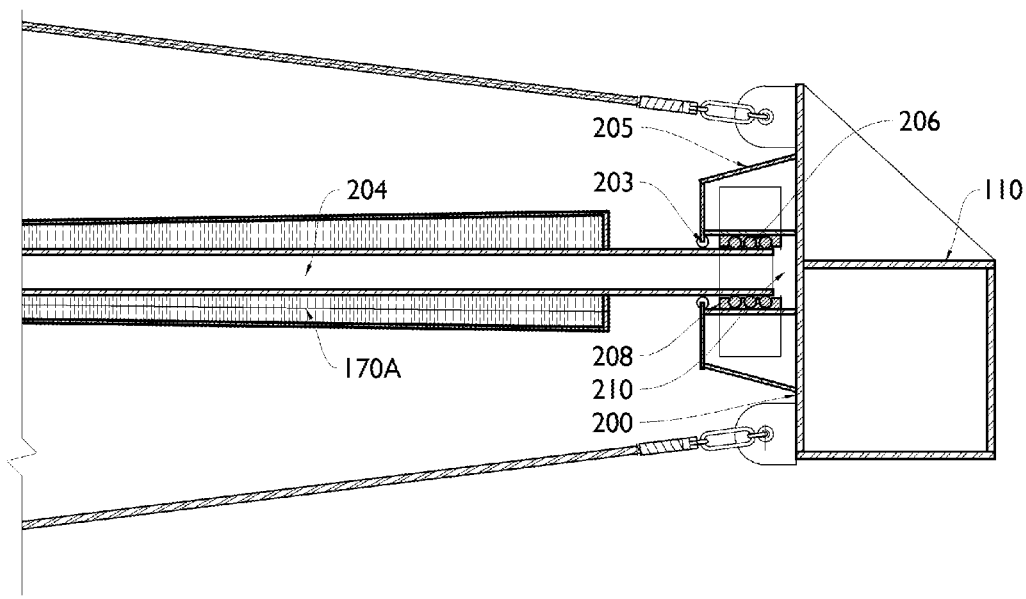
FIG. 3D is a partial cut-away view showing the mounting of the proximal pivot rods of the embodiment of the FIG. 1.

A rotating hub assembly 32 is mounted at the top of vertical mast 20 as shown in FIGS. 3-3B. As best seen in the cross-sectional view of FIG. 3B and the plan view of FIG. 3C, the hub assembly includes a cylindrical hub housing 33 dimensioned to fit over the top portion 34 of mast 20. One or more rare earth magnets 35 are mounted in the top 36 of housing 33. One or more like magnets 37 rest in a cavity 38 at the top of the mast. Magnets 35 and 37 are positioned with like polarities opposite each other so that they repel producing a low friction MAGLEV bearing effect. Other bearing types may of course be used. Additionally, housing 33 is kept centered on the top of the mast by bearing packs 39 that are attached to the inner wall 40 of hub housing 33 so that they ride along the outer surface 41 of the top portion 34 of the mast, transferring lateral forces from the upper hoop to the mast.

FIG. 3B also illustrates one of the five actuator enclosures 42 which are each dedicated to a different vertical blade distributed evenly about the outside of hub housing top 36. Each of these enclosures supports a proximal pivot rod 172 of one of horizontal blades 170A-170E in a bore 174 fitted with bearings 176. Opposed actuator driver arms 178 and 180, which engage the outer surface of rods at diametrically opposed locations, will shift up and down in response to the algorithm-controlled operation of actuators (not shown) to rotate the rods in order to feather the angles of the blades to maximize the power output of the turbine. It should be noted that alternatively mating gearing or direct drive arrangements may be provided about the rod and along the driver arms.

Indeed, various different known types of actuators can be used, including an electro-hydraulic actuator.

Additionally, a small generator 43 may be located in the actuator enclosure. Generator 43 includes a rotary member 44 that engages the outer surface 41 of the top portion 34 of the mast as it rotates, driving the generator. This generator maintains a charge in batteries 45 that power the actuators.

A series of upper attachment brackets 46 project radially from the top 36 of the hub housing and a like number of lower attachment brackets 47 project radially from an area adjacent the bottom of the hub assembly. Brackets 46 and 47 include eyelets 48 for receiving upper hoop cabling 50.

Figure 4:
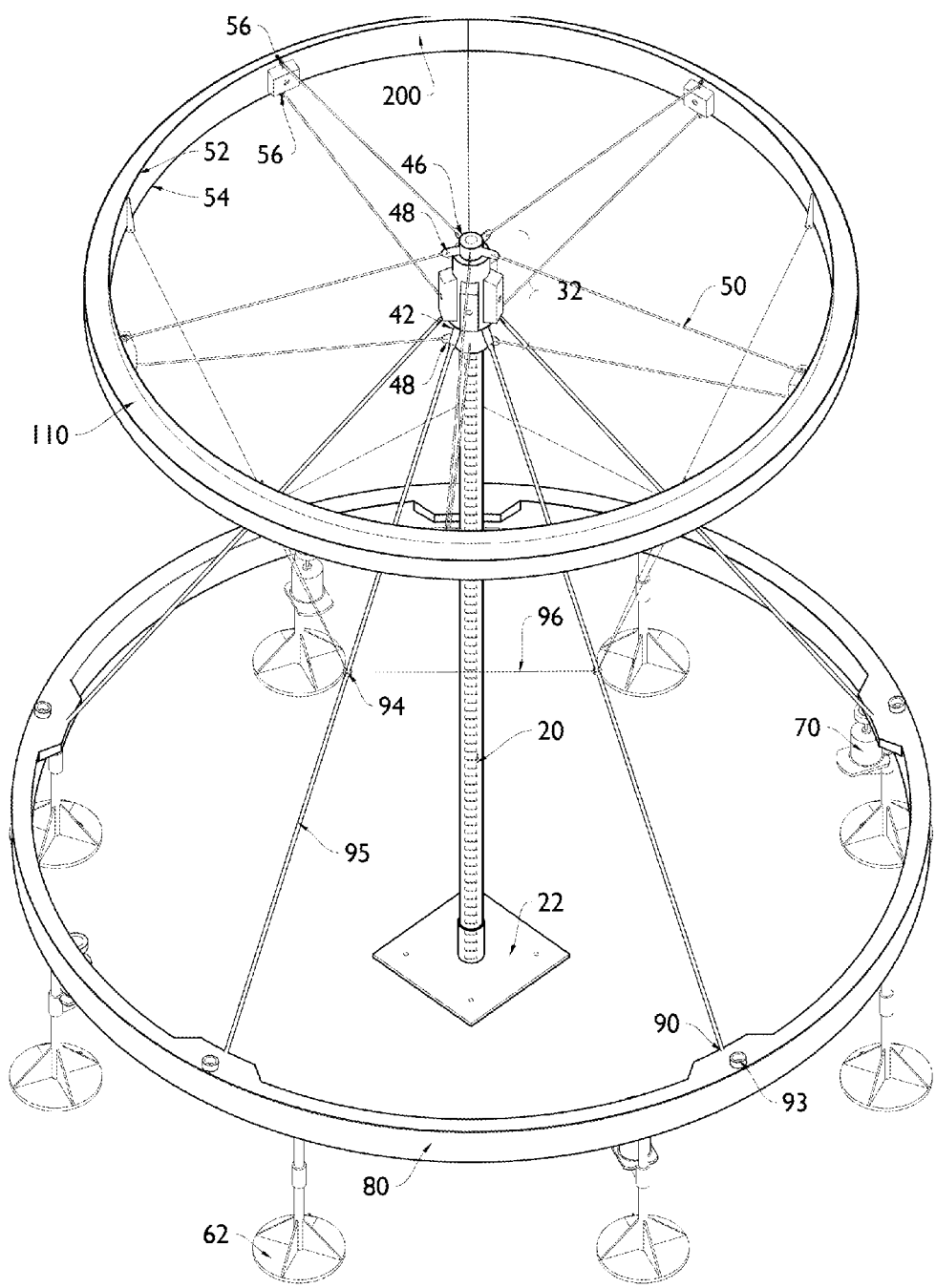
FIG. 4 is an axonometric view showing the bicycle rim and spokes configuration of the upper hoop of the embodiment of FIG. 1.

Turning now to FIG. 4, upper hoop 110 is shown affixed to hub assembly 32. The upper hoop includes inwardly directed top and bottom lips 52 and 54 that have eyelets 56 for receiving upper hoop cabling 50. Upper hoop cabling 50 is thus run between the eyelets in top and bottom lips 52 and 54 and the eyelets 48 in upper and lower attachment brackets 46 and 47 of hub 32 to fix the upper hoop to the hub in a "bicycle wheel-and-hub" configuration.

Figure 5:
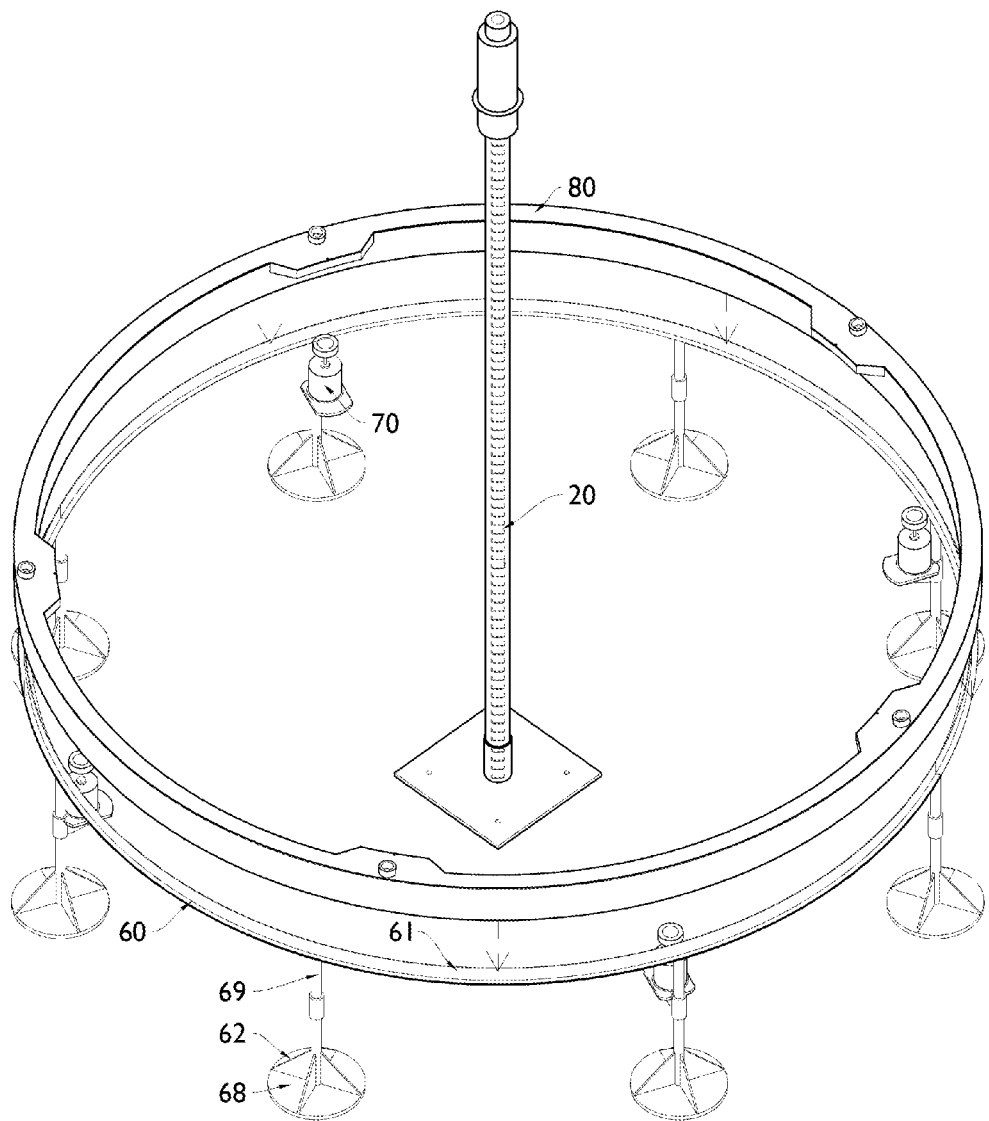
FIG. 5 is an axonometric view of the lower hoop juxtaposed above the guideway of the embodiment of FIG. 1.

As seen in FIG. 5, vertical mast 20, which is centered within the area circumscribed by a guideway 60, establishes the center point of the plan circle of the turbine and the center point of the guideway over which lower hoop 60 is positioned. Piers 62, which support the guideway, include a base 68 and a rod 69 running vertically upward which is attached to the guideway. Piers 62 rest on and are in turn affixed to a high rise building roof deck or other supporting surface or structure (not shown).

Figure 5A:
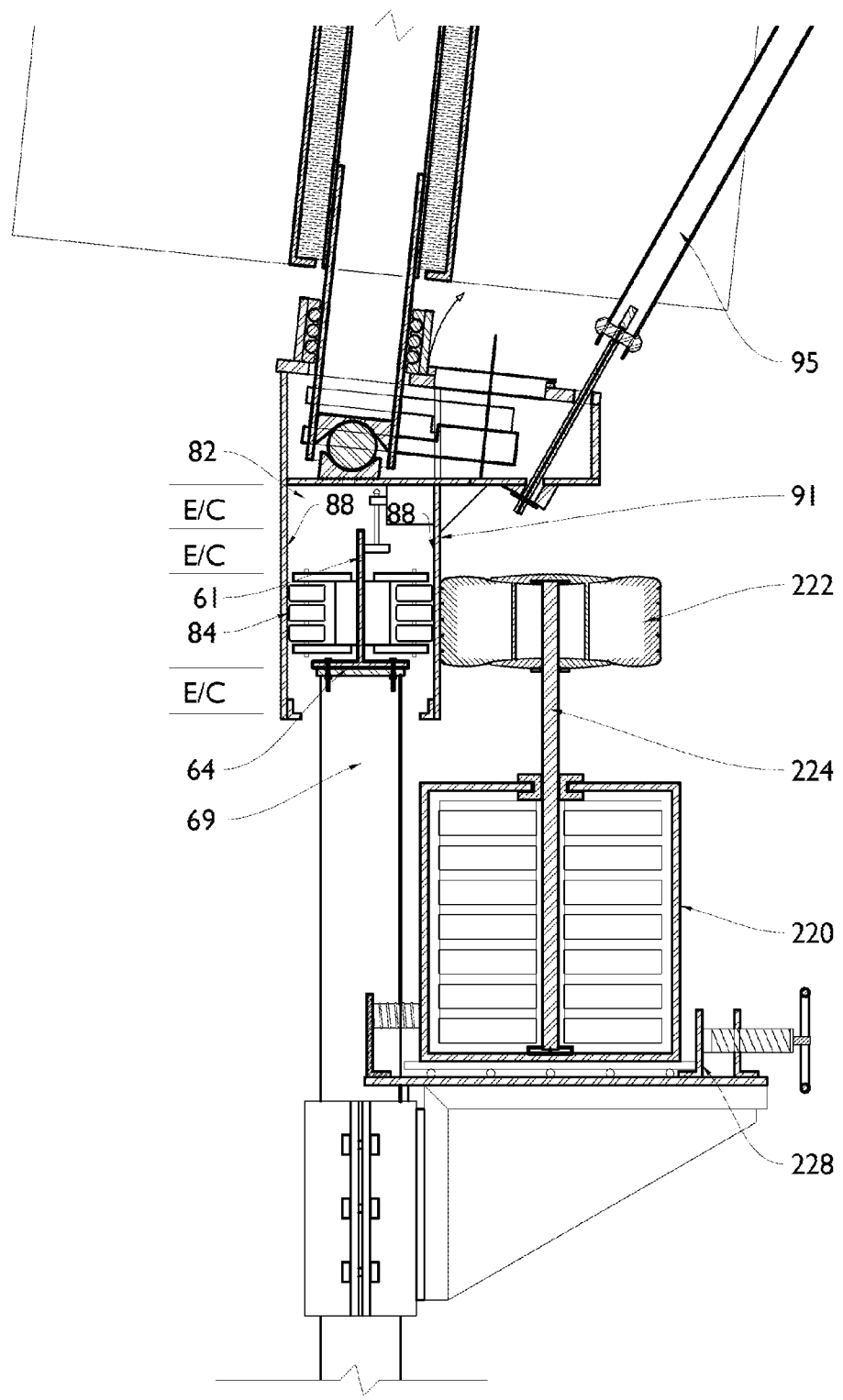
FIG. 5A is a partial cross sectional view showing the relationship of the guideway, the lower hoop, and the generator package of the embodiment of FIG. 1.

FIG. 5A is a cross-sectional view which best illustrates the generally inverted "T" shape of the guideway with the base of the inverted "T" labeled 64 and the longer leg of the "T" pointing vertically upward so that it forms an annular flanges that is received in a corresponding annular cavity 82 of lower hoop 80 of the device. This relationship may be reversed with the cavity in the guideway to receive an annular flange on the hoop.

Posts 66 also support one or more generator packages 70 that may be of conventional construction and will be employed as explained in further detail below. For example, the generators may be of a permanent magnet type, having suitable cut-in speeds of about 15-200 rpm. Conventional power electronics may be used to convert the alternating current produced by the generators to an appropriate voltage and frequency using a conventional rectifier, d.c. stage adjustment and inverter.

Lower hoop 80 is shown in FIG. 5 juxtaposed above guideway 60. FIG. 5A in turn shows a partial view of the guideway in its final position within the lower hoop. Lower hoop 80 thus includes an annular downwardly directed cavity 82 that receives bearing assemblies 84 mounted on opposite sides of center leg 61 of the guideway. The bearing assemblies 84 are positioned and dimensioned to engage the inner walls 88 of cavity 82. This ensures that lateral movement of the lower hoop is smooth with low friction but constrained by the guideway which braces the lower hoop to oppose lateral forces and yaw while keeping the circular rotation of open frame structure 10 true.

Also, since in this embodiment the lower hoop sits above rather than on the guideway it is guided by but not gravity supported on the guideway. Since the vertical blades as well as many components of the frame structure will expand and contract with outdoor temperature changes and in response to other stresses on the system, this lower hoop/guideway arrangement will accommodate such expansion and contraction "E/C" (FIG. 5A) while ensuring proper rotation of the frame structure. In less preferred embodiments of the invention, however, the lower hoop may rest on the guideway or an alternative hoop restrainer structure.

Figure 6:
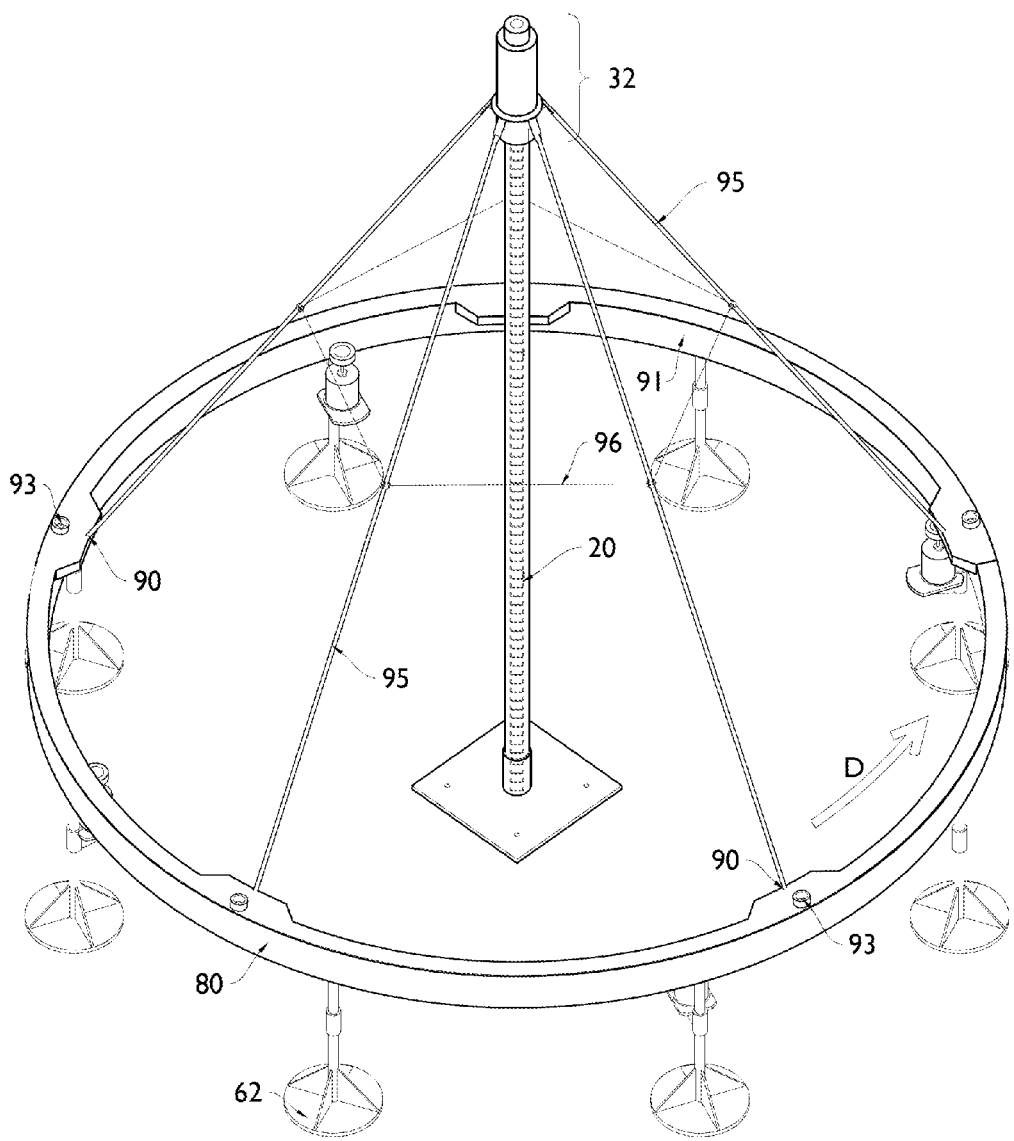
FIG. 6 is an axonometric view of the lower hoop of the embodiment of FIG. 1 showing anchor points for support rods.

Turning to FIG. 6, lower hoop 80 is shown including a series of evenly spaced anchor points 90 along the inner wall 91 of the hoop for attachment of support rods 95, as will be described below. Lower hoop 80 also includes a series of upstanding pins 93 (or alternatively cavities) that receive the gravity load of vertical blades 140A-140E transferred by the pivot rods of the blades, as also will be described below.

Lower hoop 80 is positioned above the guideway for travel in counterclockwise direction "D". Lower hoop 80 is hung from hub assembly 32 in a "maypole-like" configuration by a series of support rods 95 that are affixed at their proximal end to the bottom hoop as shown in FIG. 5A and at their distal end to the hub as shown in FIG. 3B. As can be seen in FIG. 6, the support rods are preferably attached opposite the bearing point of each vertical blade to minimize potential interference with the blades as they pivot.

Support rods 95 are interconnected by a central support cable 96 which encircles and is attached to the support rods preferably near their midpoints 98. Central support cable helps the entire interconnected system of support rods 95 and the cabling associated with the upper and lower hoops to withstand centrifugal or outwardly directed forces experienced during rotation of the frame structure of the turbine. The central support (as well the various other cables) described herein) cable preferably will be fitted with turnbuckles (not shown) to permit it to be tensioned when the frame structure is assembled and to permit future adjustments as required to meet design standards for the device. It is preferred that the central support cable lie in a generally horizontal plane forming a middle pentagonal hoop in the illustrated configuration, to minimize interference with movement of blades 140A-140E and wind currents that flow across or within the frame structure.

Figure 7:
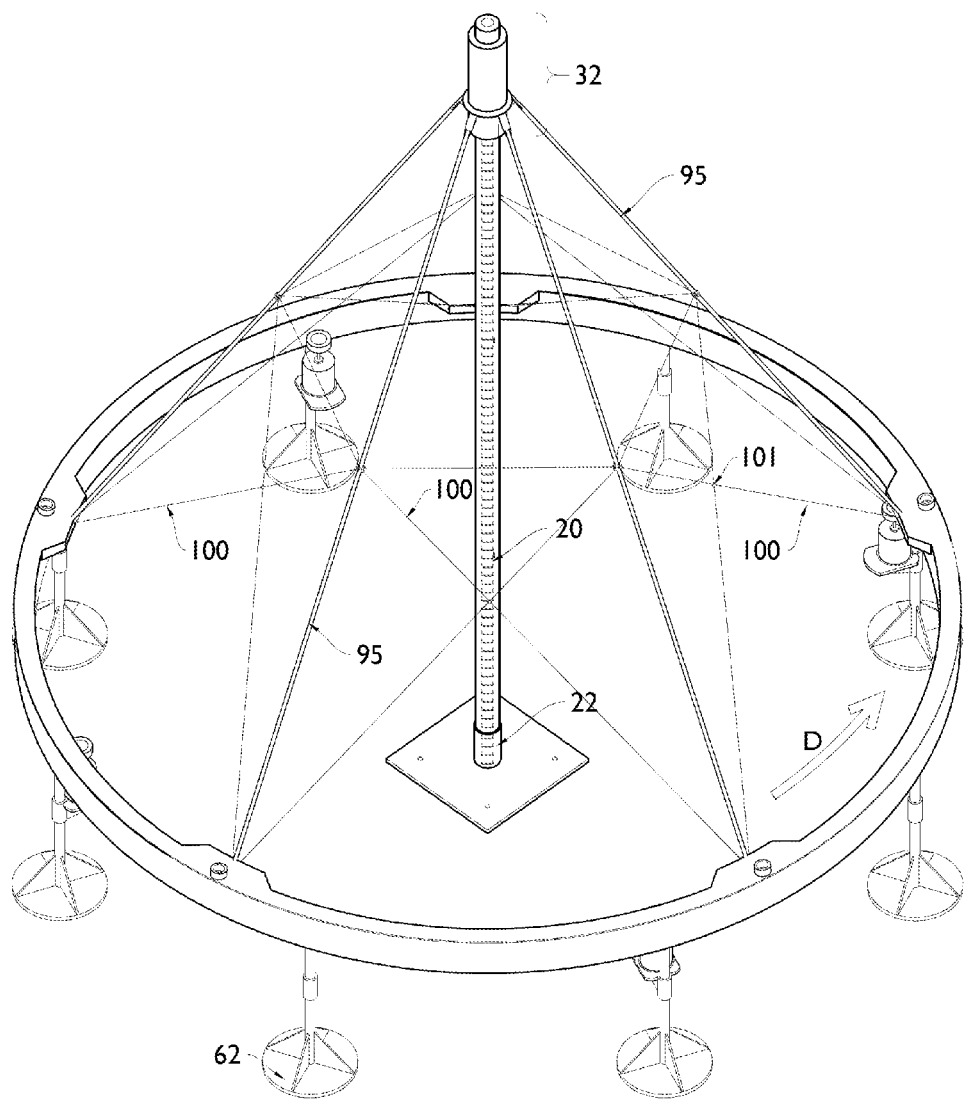
FIG. 7 is axonometric view corresponding to FIG. 6 in which X bracing has been added to help triangulate forces on the support rods and lower hoop.

Lower "X" braces 100 in FIG. 7 are formed with cabling running from the points of attachment of central support cable 96 to the two support rods 95 to anchor points 90 on the lower hoop. The "X" braces may be affixed at their crossover points 101. The lower "X" braces help to efficiently triangulate the forces acting on the support rods and the lower hoop to assist in conjunction with the upper "X" braces attached to the upper hoop, to allow the lower hoop to more synchronously and therefore in tandem with the upper hoop and the central hub.

Figure 8:
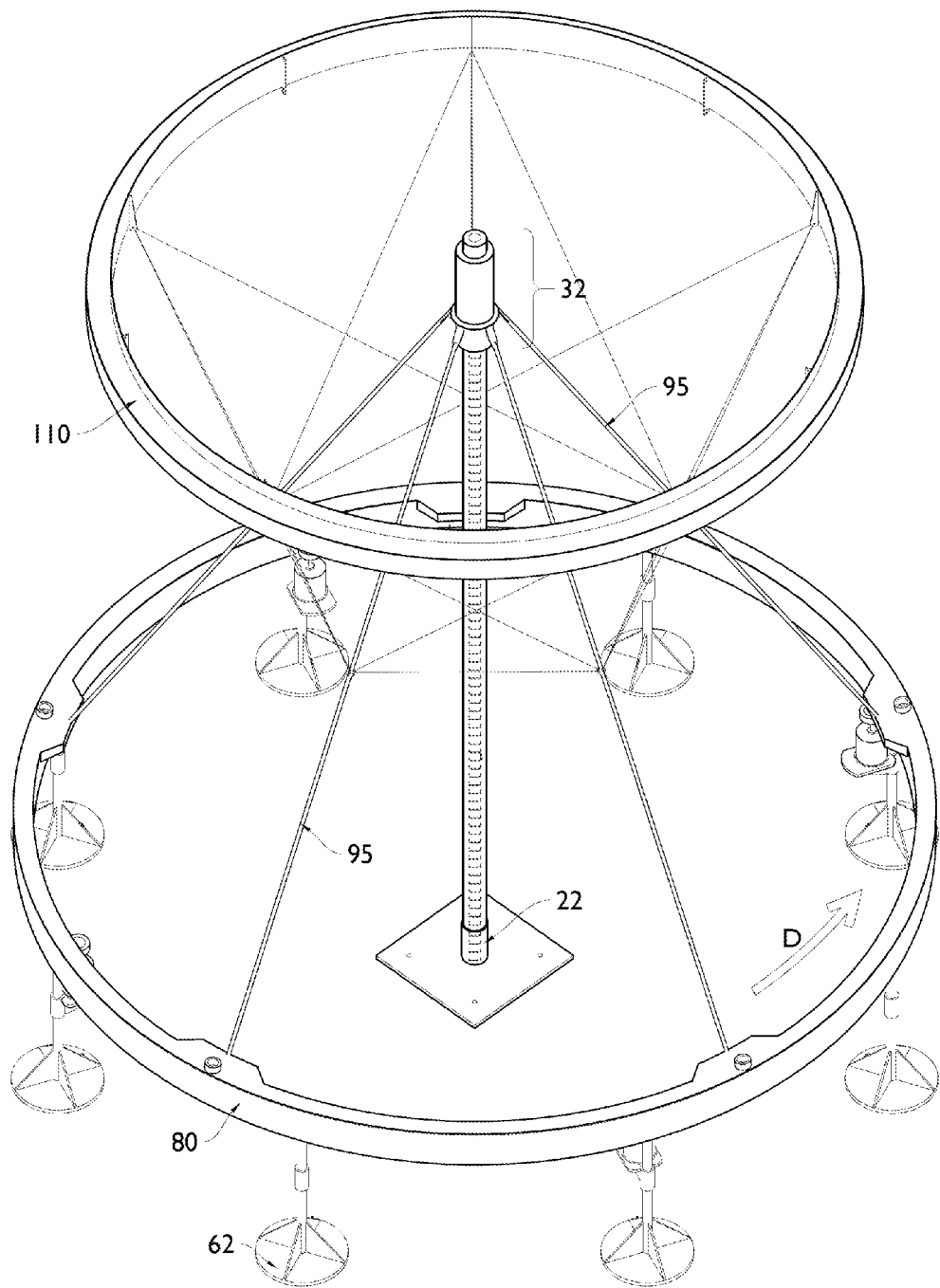
FIG. 8 corresponds to FIG. 4 but includes X bracing to help triangulate forces acting on the upper hoop.

FIG. 8 depicts upper "X" braces 104 comprising cabling running from the bottom of top hoop 110 to the rod midpoints 98. The upper "X" braces complete the "tube" began the lower the lower "X" braces.

Figure 9:
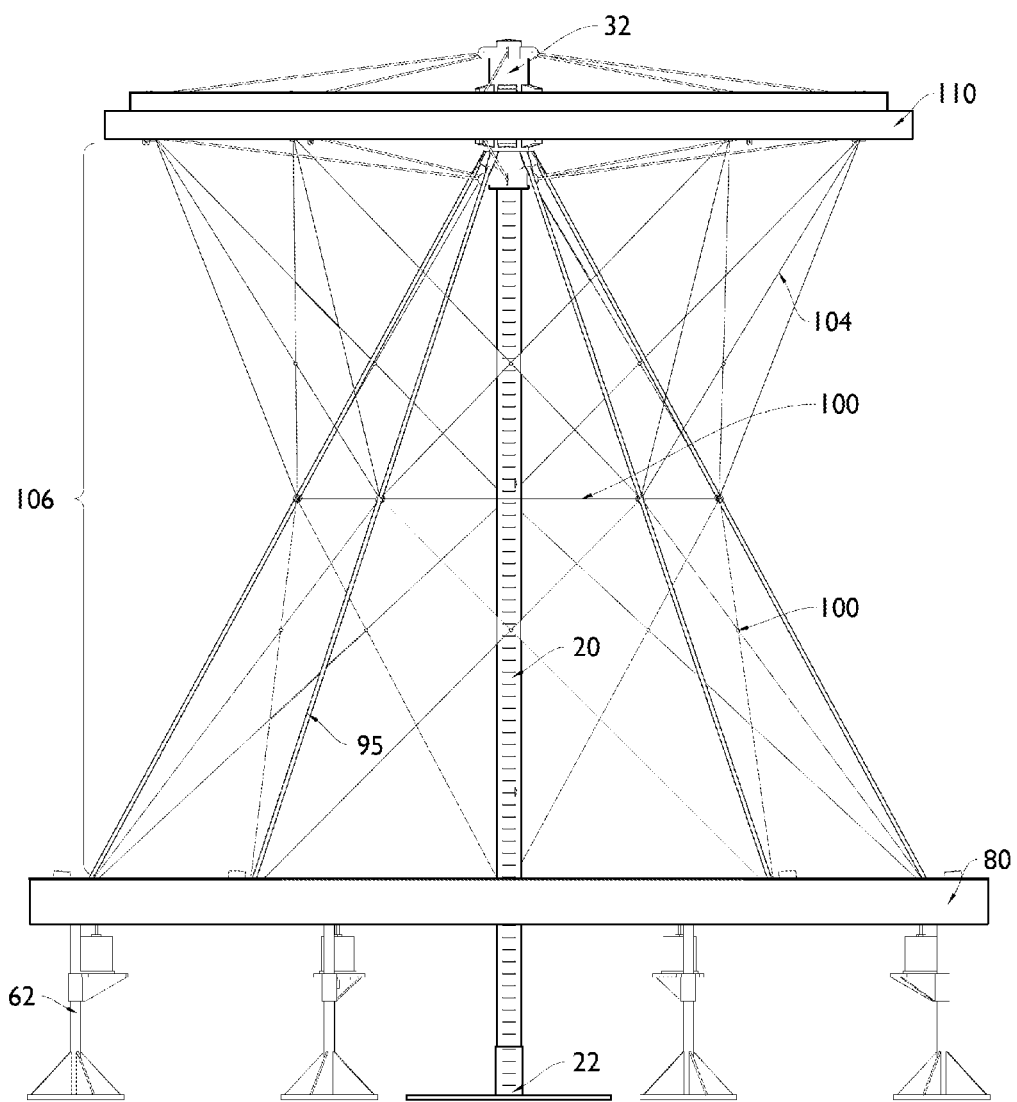
FIG. 9 is an elevation view of the fully assembled central support structure of the embodiment of FIG. 1 of the invention.

FIG. 9 shows the fully assembled frame of the turbine, with the blades removed. This is the central bracing structure 106 of frame 10. The cabling and rod supports described in connection with FIGS. 6-8 and shown as well in FIG. 9 not only ensure that the upper and lower hoops move synchronously, i.e., in tandem, they also make the open frame structure extremely lightweight. This minimizes drag due to friction, and achieves a substantial reduction in impediments to movement of naturally occurring and generally horizontal wind across the frame while also allowing vertical building induced wind to move vertically through to the horizontally disposed blades. The five lower "X" braces, which efficiently triangulate forces and reduce the mass of the overall structure, form a tube (structurally) in conjunction with the five upper "X" braces. Each are connected to a hoop and acts as a system that ties the tubes together for synchronous movement. The tube links through the center hoop at the plane of central support cable 96 which acts like a belt, reducing its expansion through the action of centrifugal forces.

Figure 1B:
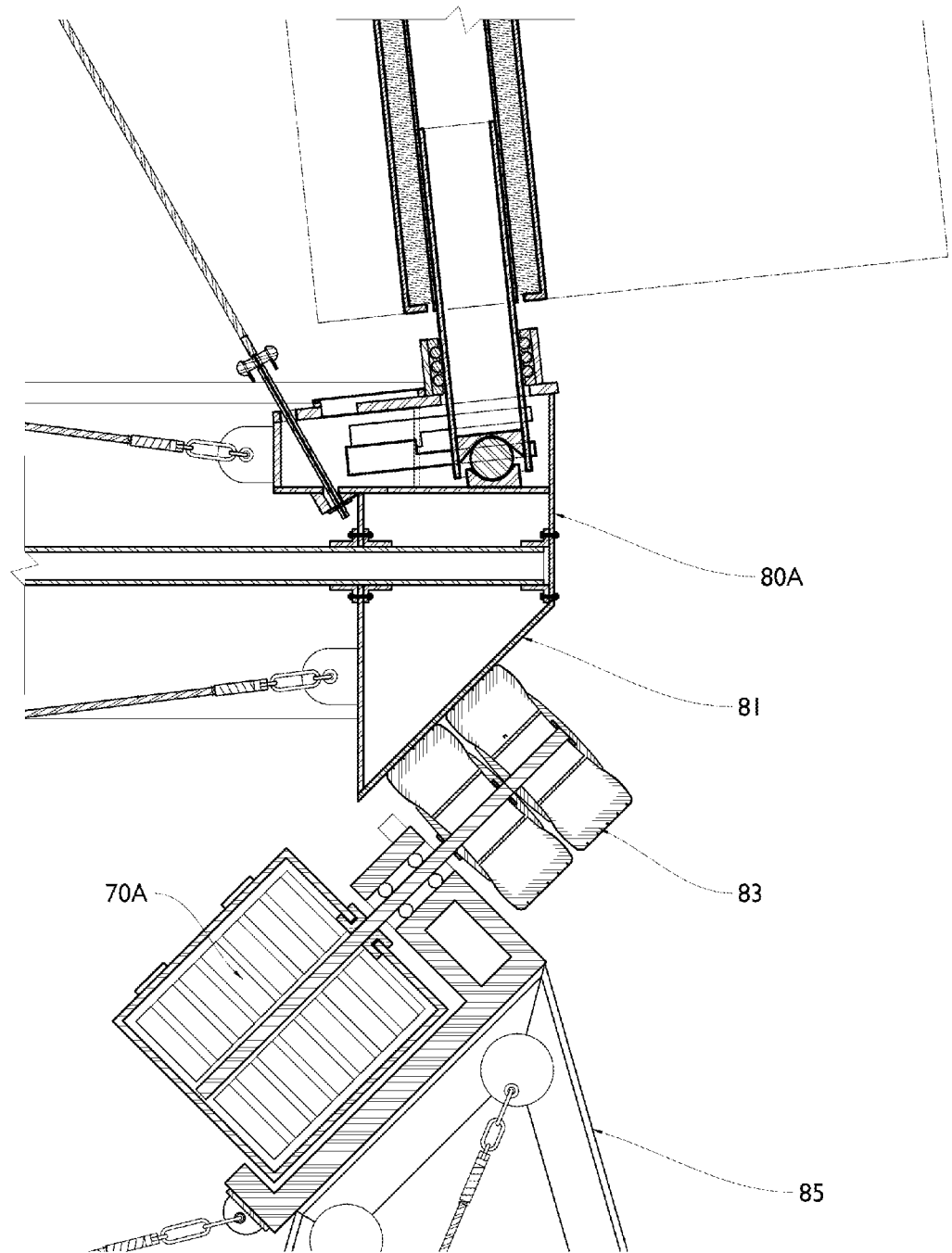
FIG. 1B is a partial sectional view of the lower roller support configuration of the embodiment of FIG. 1A.
Figure 1C:
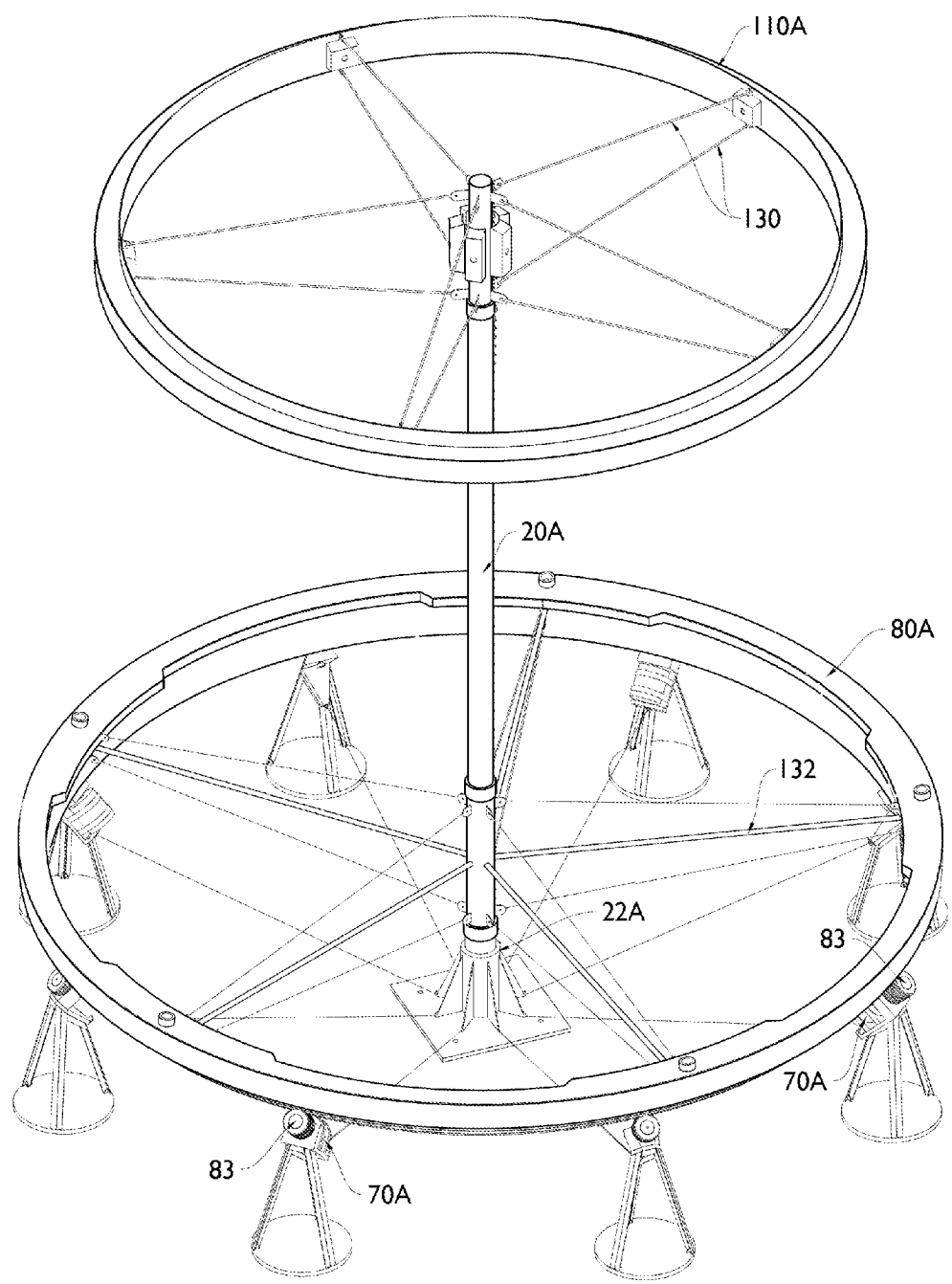
FIG. 1C is a perspective view of the bicycle wheel and spoke supporting structure of the upper and lower hoops of the embodiment of FIG. 1A.

FIGS. 1A-1F illustrate an alternative embodiment of the invention in which a rotating vertical mast 20A with a magnet bearing including opposed magnets 35A and 37A is used to support an open frame 10A. In this embodiment upper hoop 110A is mounted to the top of the mast with a bicycle wheel hub-and-spokes arrangement 130 generally as described in connection with the earlier figures and as illustrated in FIG. 1C. Lower hoop 80A is similarly attached to vertical mast 20A with a bicycle wheel hub-and-spokes arrangement 132. However, since the bottom hoop is now a frame supporting member (there is no structure corresponding to guideway 60), a series of rollers 83 are evenly spaced about a bottom annular surface 81 of hoop 80A. In the illustrated embodiment, bottom annular surface 81 is angled about 45 degrees to the vertical and rollers 83 are supported on piers 85 at a corresponding angle (FIG. 1B). This helps maintain the frame 10A in alignment as it rotates. Finally, one or more generator packages 70A may be driven by rollers 83.

Figure 1D:
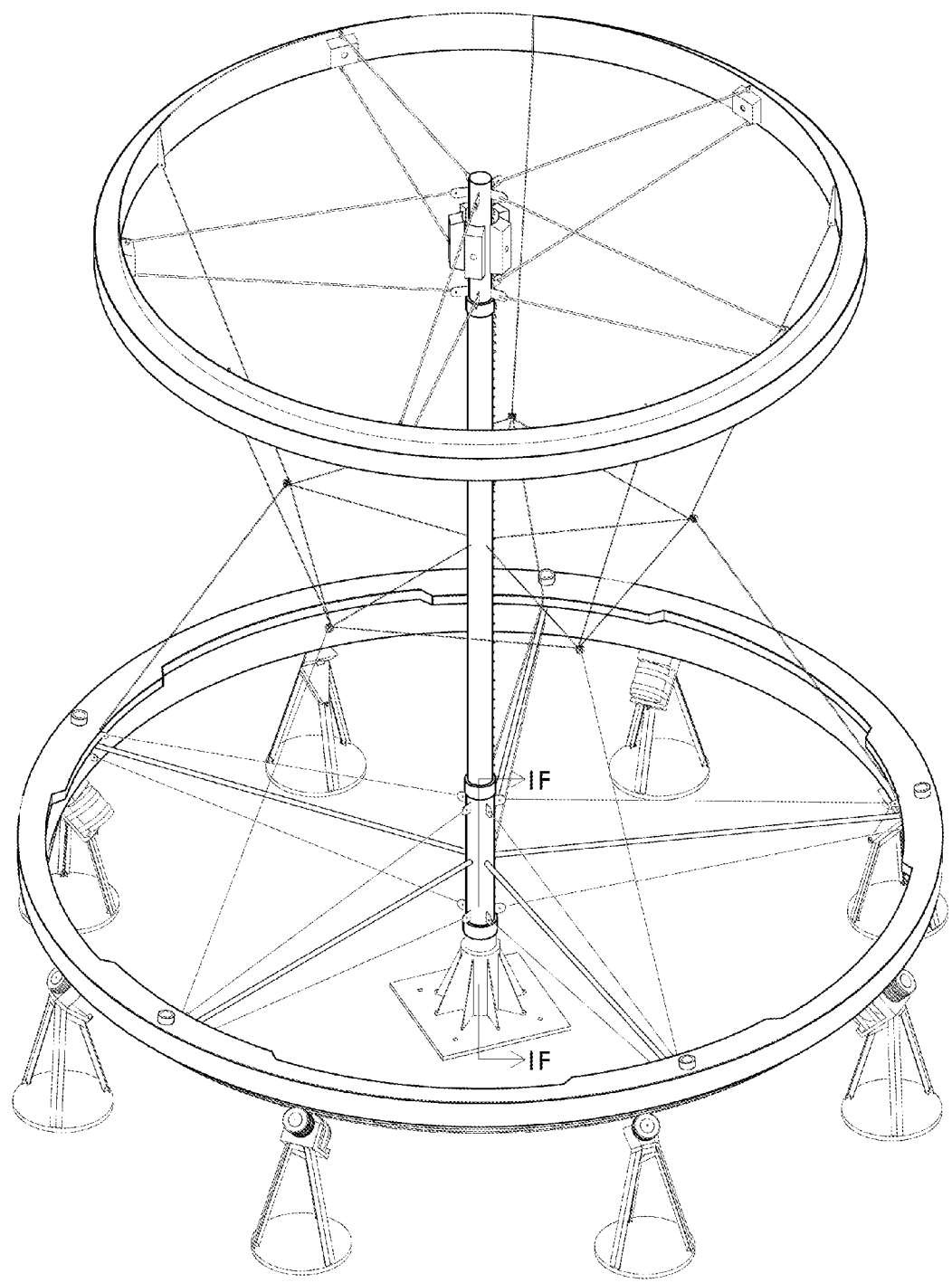
FIG. 1D is a perspective view of the central bearing structure of FIG. 1B.
Figure 1E:
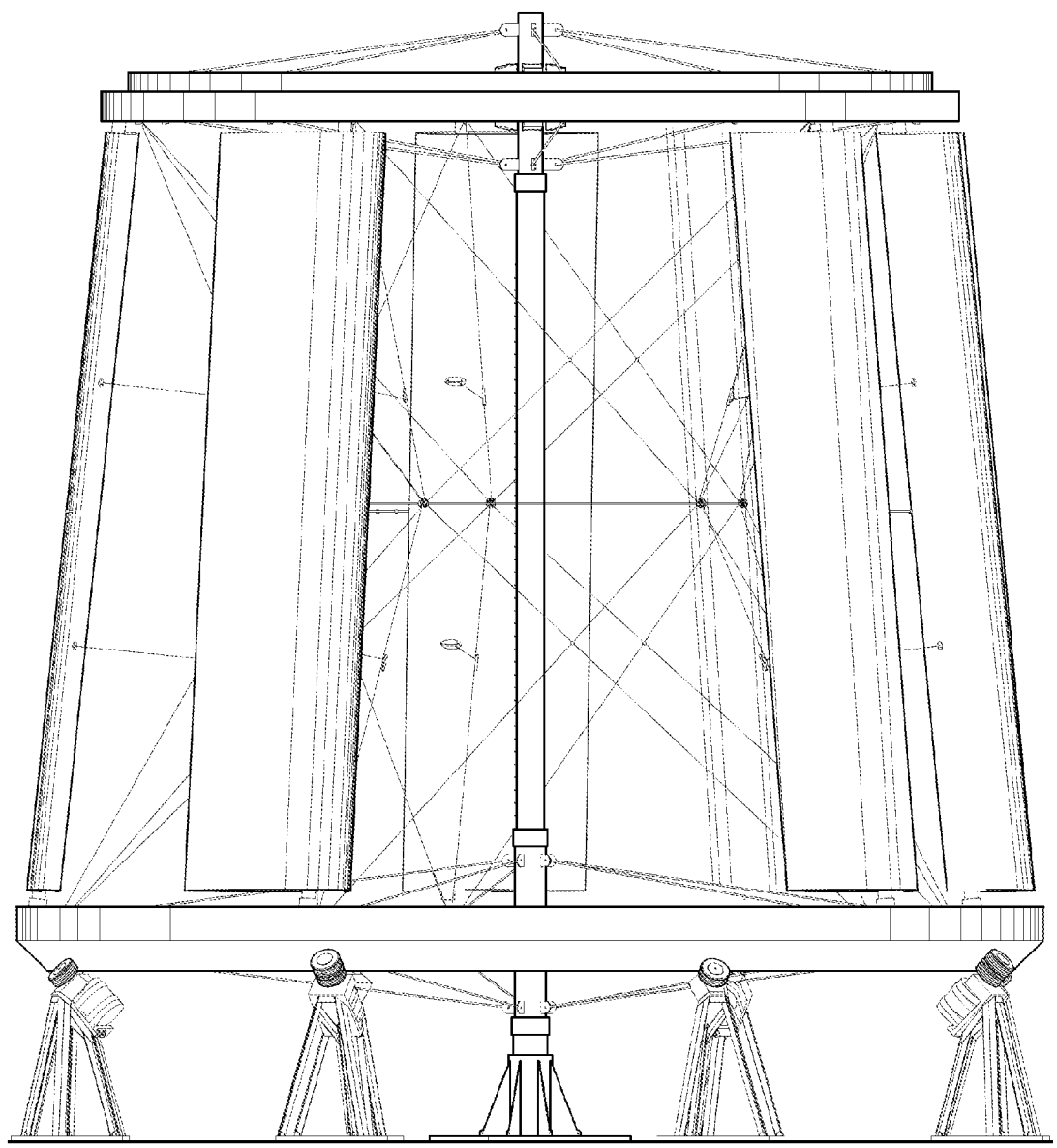
FIG. 1E is an elevation view of the apparatus shown in FIGS. 1A-1D.

The remaining features of the frame of this alternative embodiment are generally as described above in connection with the embodiment of frame 10, and more particularly as shown in FIGS. 1D and 1E.

FIG. 10 illustrates the positioning of vertical wind energy harvesting blades 140A-140E on upstanding pins 93 of lower hoop 80, although as noted above, cavities for receiving the blade pivot rods may be used instead of pins. Upper hoop 110 has been removed in this figure for purposes of better viewing.

Although vertical blades 140A-140E (as well as horizontal blades 170A-170E) are symmetrical in shape with chord C bisecting the blades, irregularly shaped blades with a curved central core may be used. Also, although blades 140A-140E are referred to as "vertical" or "generally vertical" we mean by these terms that these blades may be tilted ±12° from the vertical (i.e., both inwardly and outwardly from the vertical), with upper and lower hoop diameters adjusted as necessary, forming truncated conical shapes, a cylinder (at 0°) and inverted conical shapes. Currently, it is preferred that the vertical blades be at an angle of +6°, with a smaller hoop at the top, as shown.

Each of blades 140A-140E has an outer surface 142 and an inner surface 144 as well as a leading edge 146 and a trailing edge 148 and a top edge 154 and bottom edge 156. The blades may be hollow or filled and may be made of aluminum, carbon fiber, or other appropriate materials. The blades will be affixed to a pivot rod 151 centered between the inner and outer surfaces of the blade that establishes a longitudinal pivot axis 150. Also, when tip speed ratio (or TSR) is referred to herein the "tip" is an imaginary point 102 (FIG. 10) on the pivot axis 150 (or the average radius R taken along the pivot axis from the top hoop to the bottom hoop).

The vertical blades are subject to variable centrifugal force tending to deflect or bend the blades causing bowing and other deformations that would interfere with blade efficiency as the turbine frame spins. The amount of deflection or bending of the blades is dependent upon the centrifugal force exerted and the length of the blade. Typically, for a given force, the degree of deflection can be reduced by making the structure of the vertical blades more robust and therefore heavier or by making the blades shorter, thereby limiting the output of the turbine.

Figure 10A:
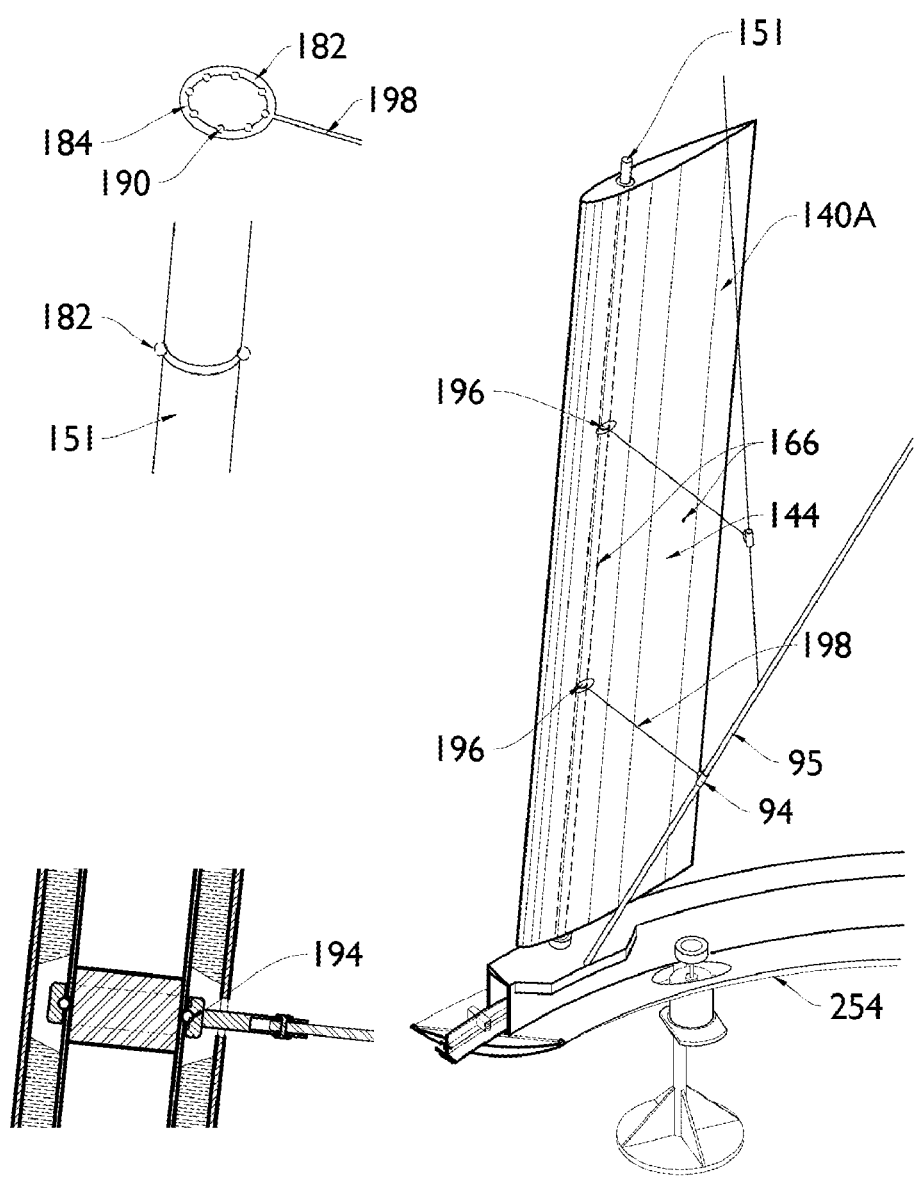
FIG. 10A illustrates various features of the system for countering centrifugal forces on the vertical blades as used in both embodiments of the invention.

The present invention, however, provides a unique alternative approach to controlling deflection of the vertical blades. This is illustrated in FIG. 10A in which a bearing ring 182 is shown comprising a rigid outer ring 188 with a series of ball bearings 190 rotatably fixed on its inner diameter. The bearing ring is attached to a bearing cable 192. In the illustrated embodiment, bearing rings 182 are located at approximately one-third and two-third positions on pivot rod 151 preferably with bearings 190 riding in a slot 194 in the rod. The rings (and bearing cables) may, of course, be attached at other intermediate locations along the pivot rod. An opening 196 is formed opposite the bearing rings so that cable 192 can extend from the rod to attachment points 94 on support rods 95. Opening 196 must be wide enough to prevent interference between cable 192 and the inner surface 144 of the blade as it pivots about the pivot rod. These cables and their attachment to the pivot rod allow rotation of the blade to occur with limited friction while greatly limiting deflection or bending of the blades.

FIG. 10B illustrates the centrifugal forces. Thus, in this figure vertical blade 140A is shown with one feathering position in solid lines and another feathering position in broken lines. As the frame rotates the blade will experience centrifugal forces in direction CF. These forces are opposed in direction OF by cable 198 which is attached preferably at a 90° angle to ring 182.

Figure 11:
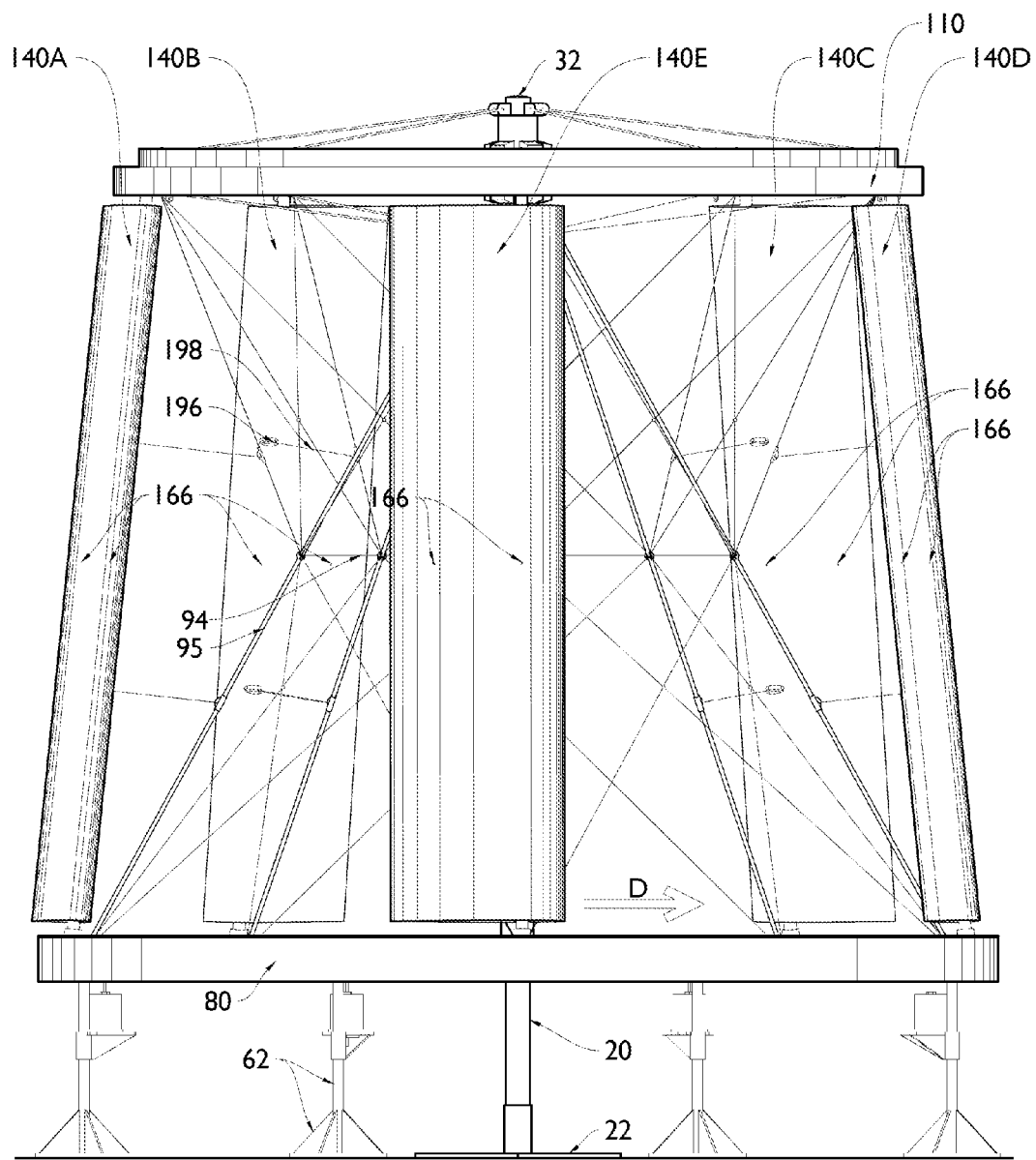
FIG. 11 is an elevation view of the embodiment of FIG. 1.

FIG. 11 shows the wind turbine with both upper hoop 110 and lower hoop 80 in place and the vertical blades mounted therebetween. This figure highlights how the frame structure of the present invention is able to present the vertical blades on the periphery of the frame structure with no outer members that would interfere with wind capture and an internal structure offset from the periphery to avoid physical interference with the vertical blades that rely upon thin cables and support rods for support and therefore because of their small effective diameter also presents minimal interference with wind flow moving across or within the structure.

Returning now to FIG. 2, horizontal blades 170A-170E are shown extending between the inner surface 200 of upper hoop 110 and the outer surface of hub assembly 32. The horizontal blades include proximal and distal pivot rod 202 and 204, respectively, that define the axis of rotation of the blades. Proximal pivot rods 202 is rotatably mounted in the outer wall of actuator enclosure 42 as shown in FIG. 3B and discussed above. Distal pivot rod 204 projects inwardly from enclosure 205 which is formed on the inner surface 200 of the upper hoop. Enclosure 205 includes a bore 203 through which the distal pivot rod extends with bearings 206 encircling the bore and a bearing ring 208 which together ensure true and relatively friction free rotation of the horizontal blades as they are pivoted to maximize operation of the turbine. Also, as can be seen in FIG. 3C, enclosure 202 has a clearance area 210 beyond the distal end of pivot rod 204 so that the rod may move back and forth radially to accommodate expansion and contraction of the horizontal blade components.

In one embodiment of the invention, the horizontal and vertical blades may have controlled blade movements that are coordinated to maximize wind capture based on the varying wind speed of the induced and natural vertical winds as measured at the locations of the blades. The horizontal and vertical blades may also move independently. Also, it should be noted that while the axes of the horizontal and vertical blades may be in any relationship from aligned to evenly offset at the midpoints between the blades, it is currently preferred that the blades be evenly offset as shown in the figures. This, it has been found, produces a significant improvement in power output of the turbine.

It is currently preferred that the rotating wind turbine will drive one or more generators 220 as depicted in FIG. 5A. As shown in this Figure, generator 220 is fitted with a generally horizontally disposed tire 222 mounted on generator shaft 224. The tire is positioned opposite the inner wall 91 of bottom hoop 80. The generator is mounted in a spring-loaded sled 228 to maintain frictional contact between the outer surface of the tire and the inner surface of the hoop. Thus, as the lower hoop rotates, it will cause tire 222 to rotate, driving the generator and producing electrical current. The natural gearing ratio of the lower hoop diameter and the tire diameter are beneficial to the rotational speed of the generator rotor. The spring will also be "releasable" for tire changes and other repairs.

Figure 5B:
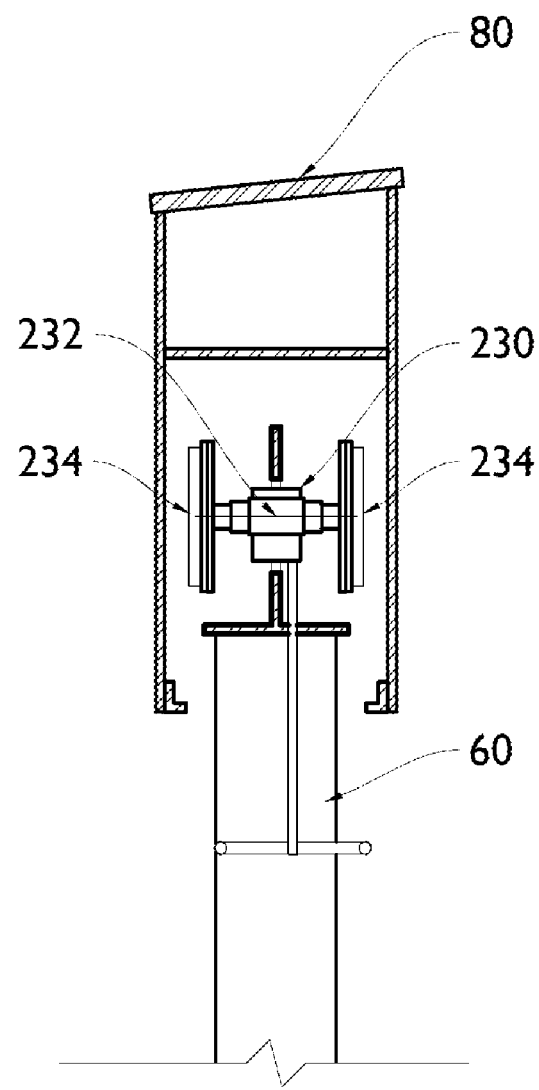
FIG. 5B illustrates a braking mechanism of the embodiment of FIG. 1.

FIG. 5B shows a braking mechanism 230 which is mounted on guideway 60. The braking mechanism includes a laterally disposed brake piston 232 that extends and retracts brake pads 234. Thus, when it is desired to stop the device and lock the lower hoop (for repairs and maintenance, for example), the piston is activated extending the brake pads until they frictionally engage the inner walls 88 of annular downwardly directed cavity 82 of the lower hoop. Preferably a plurality of brakes will be evenly disposed about the circumference of the guideway. These brakes may also be used to finish the job of the blade feathering control algorithms by reducing the speed of rotation where necessary to achieve an appropriate TSR.

FIG. 12A is a conceptual representation of components of such a tall building (or tower) induced air flow that are believed to be important to embodiments of the invention that include both generally vertically and generally horizontally disposed blades. Thus, horizontal arrows W1 represent the natural horizontal wind moving across the roof of the building and arrows W2 represent the natural horizontal wind striking the façade 244 of the building. Arrows W1 and W2 increase in length from ground level 236 to the level of the parapet 240 of roof 236 of tall building 242 to reflect the increasing wind speeds as the distance from the ground increases.

Preferably, primary deflectors 252 are attached to support rods 69 of piers 62.

Figure 12B:
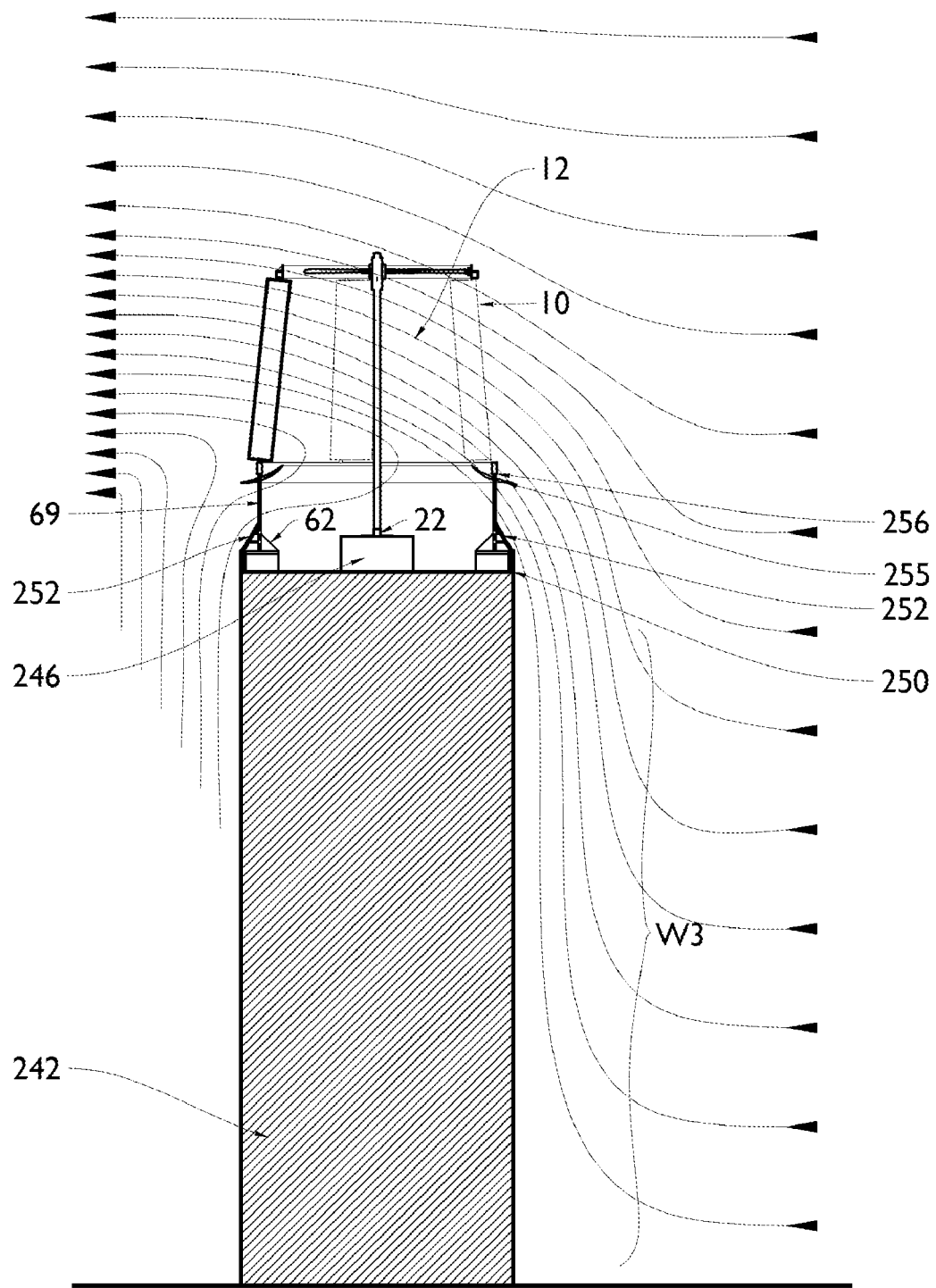

In FIG. 12B, mast base 24 is shown affixed to the top of the elevator cap housing 246 of a building 242. Frame 10 preferably is dimensioned and positioned so that it extends to at least one edge 250A of the roof, preferably at least two edges (i.e., at a corner of the roof or across the shorter dimension of a rectangular roof), more preferably at least three edges, and most preferably four edges (i.e., where the roof is square). This will maximize capture of building-induced wind flow. Preferably the angle and height of the primary deflectors will be chosen and adjusted, i.e., "tuned" to the characteristics of the specific building to best deflect a portion of the building induced winds W3 into central passage 12 of the open frame, as explained below. In the illustrated embodiment, the primary deflectors are at an angle of about 85 degrees to the roof surface. In a preferred embodiment, secondary deflectors 254 also will be mounted on support rods 69. The secondary deflectors will be refined in shape and angle for each installation as the combination of upper and lower deflectors are dependent on the building's shape, form and surface texture for their optimal "spoiler-like" action in directing a portion of the wind flow into the turbine for optimum harvesting by the blades.

FIG. 5C shows primary and secondary deflectors 252 and 254. Although primary deflector is flat and secondary deflector has a curved outer surface 255 in the illustrated embodiment, as noted above, the shape, size and positioning of the deflectors will depend upon installation site parameters. It is intended however that the building-induced wind flow will be deflected into gap G between the deflectors and into central passage 12.

Figure 12C:
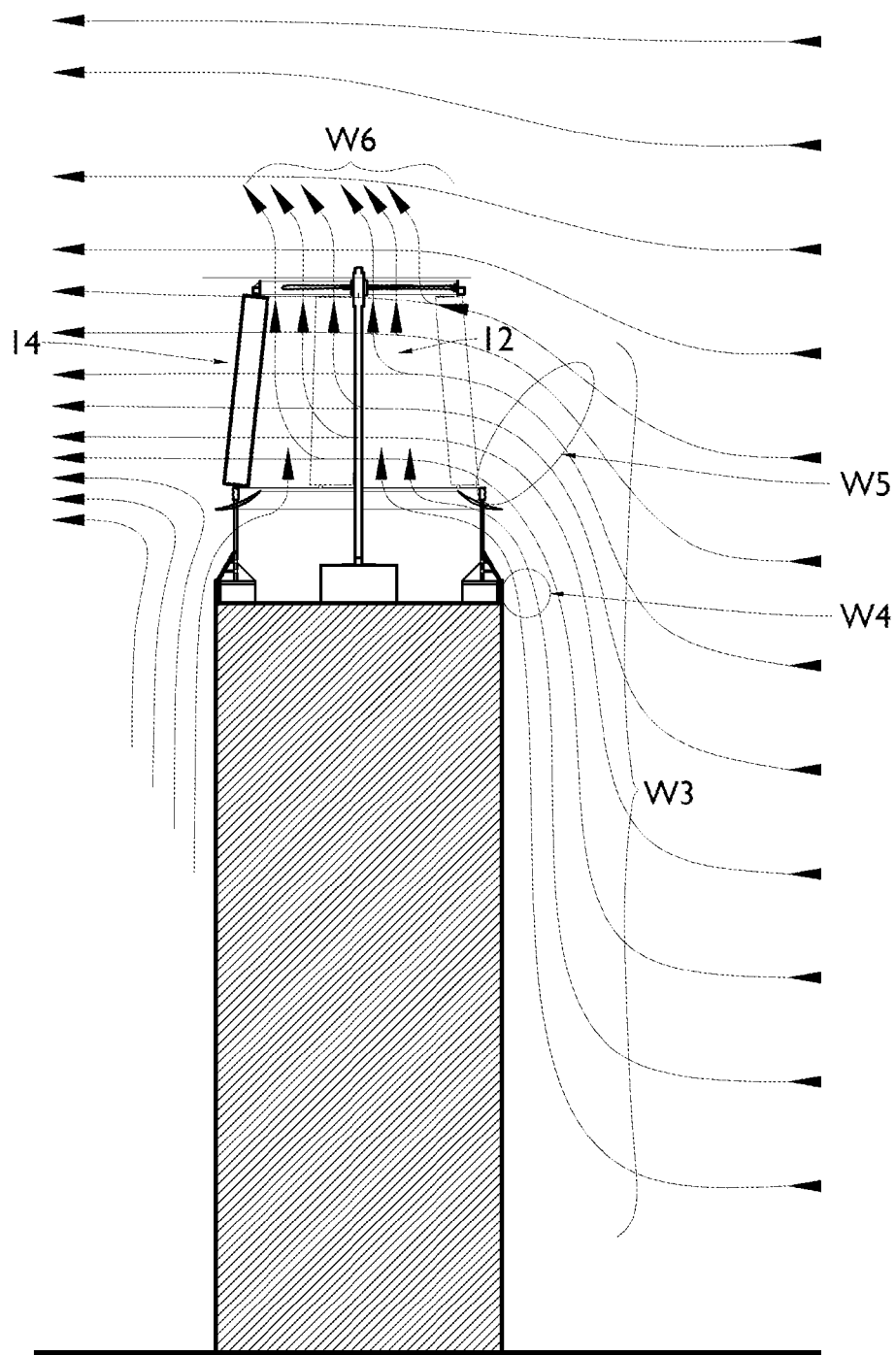
Figure 13A:
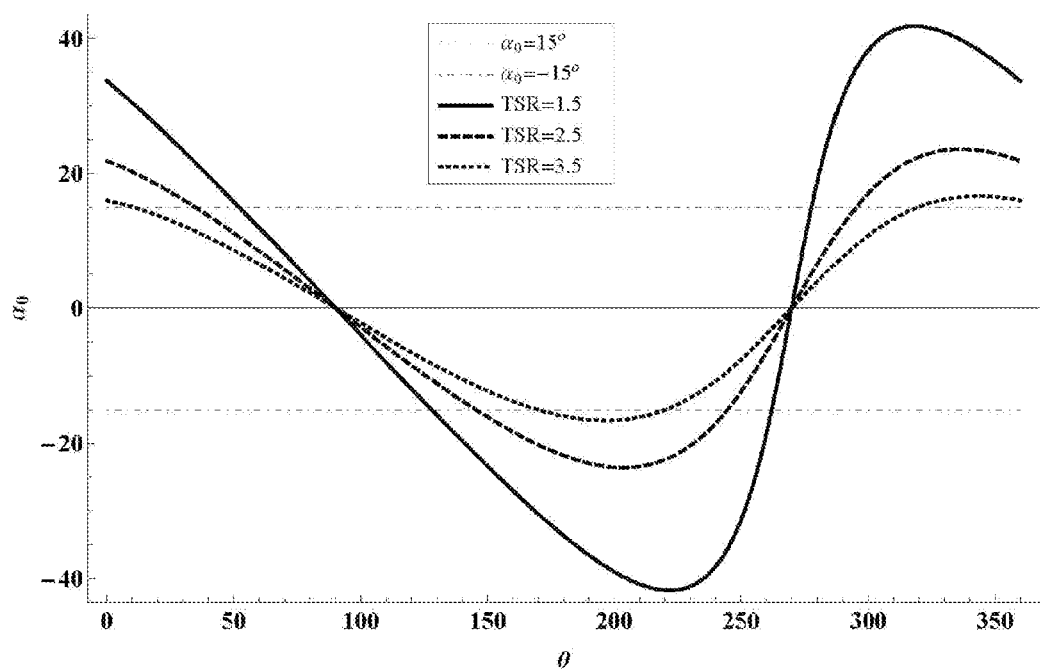
FIG. 13A is a graph of the angle of attack variation that a blade mounted at a right angle to a radial turbine arm would experience.
Figure 13B:
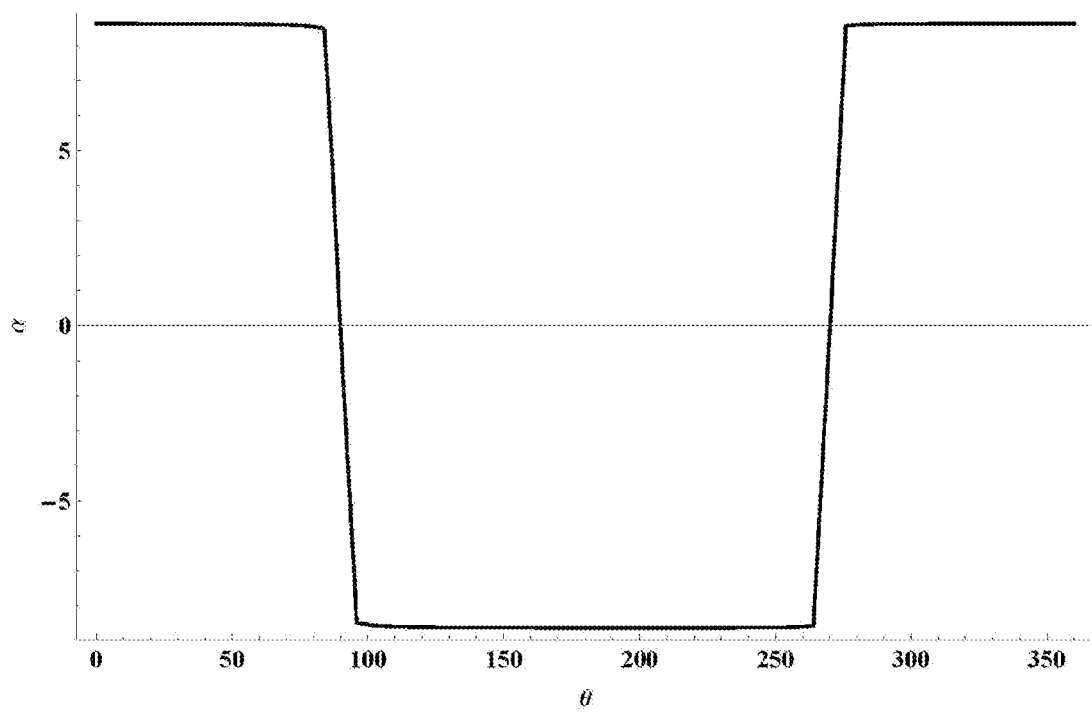
FIG. 13B is a graph of an optimal angle of attack for a given tip-speed ratio.
Figure 13C:
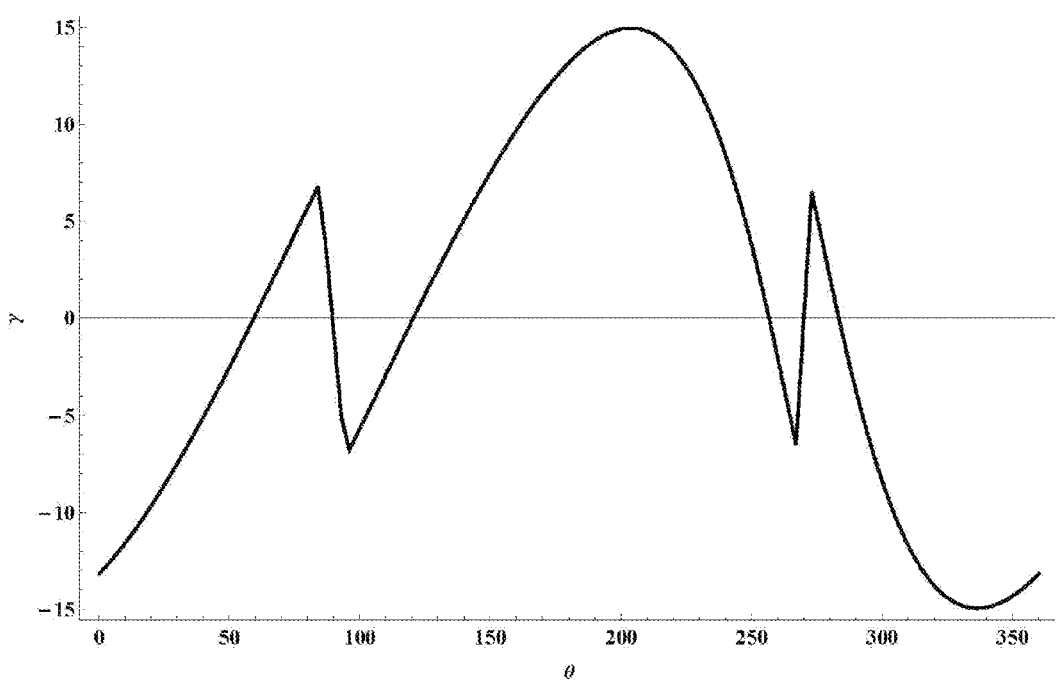
FIG. 13C is a graph of the feathering angles required to achieve the angles of attack shown in FIG. 13B.
Figure 13D:
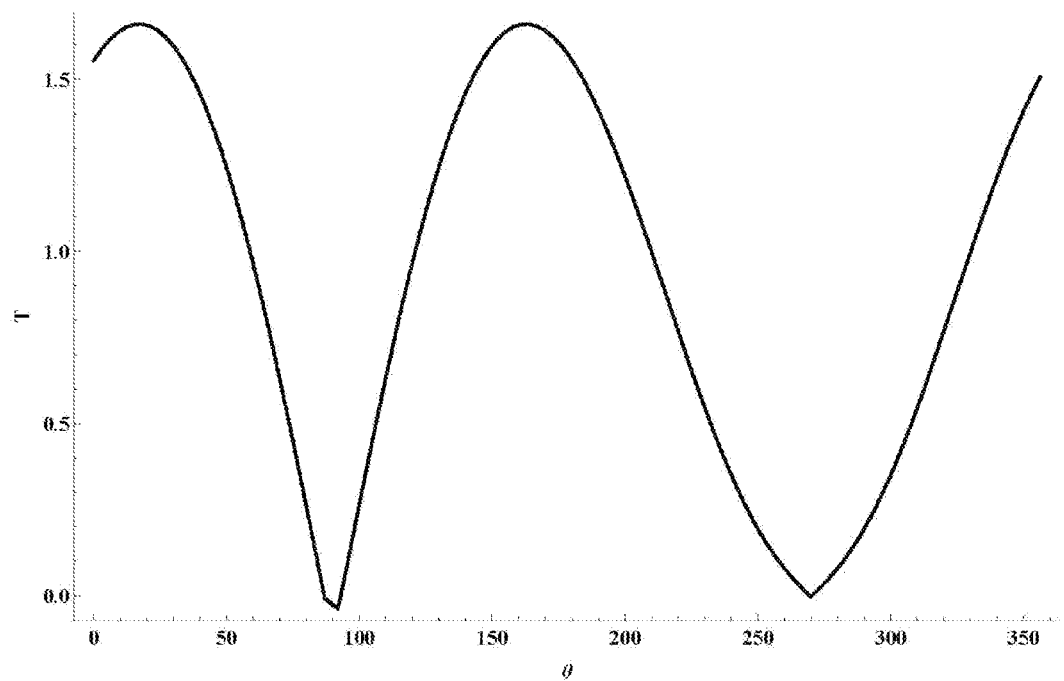
FIG. 13D is a graph of the torque provided by a turbine blade near the changes in the blade angle of attack at the plus or minus 90 degree positions of the turbine arm.
Figure 14:
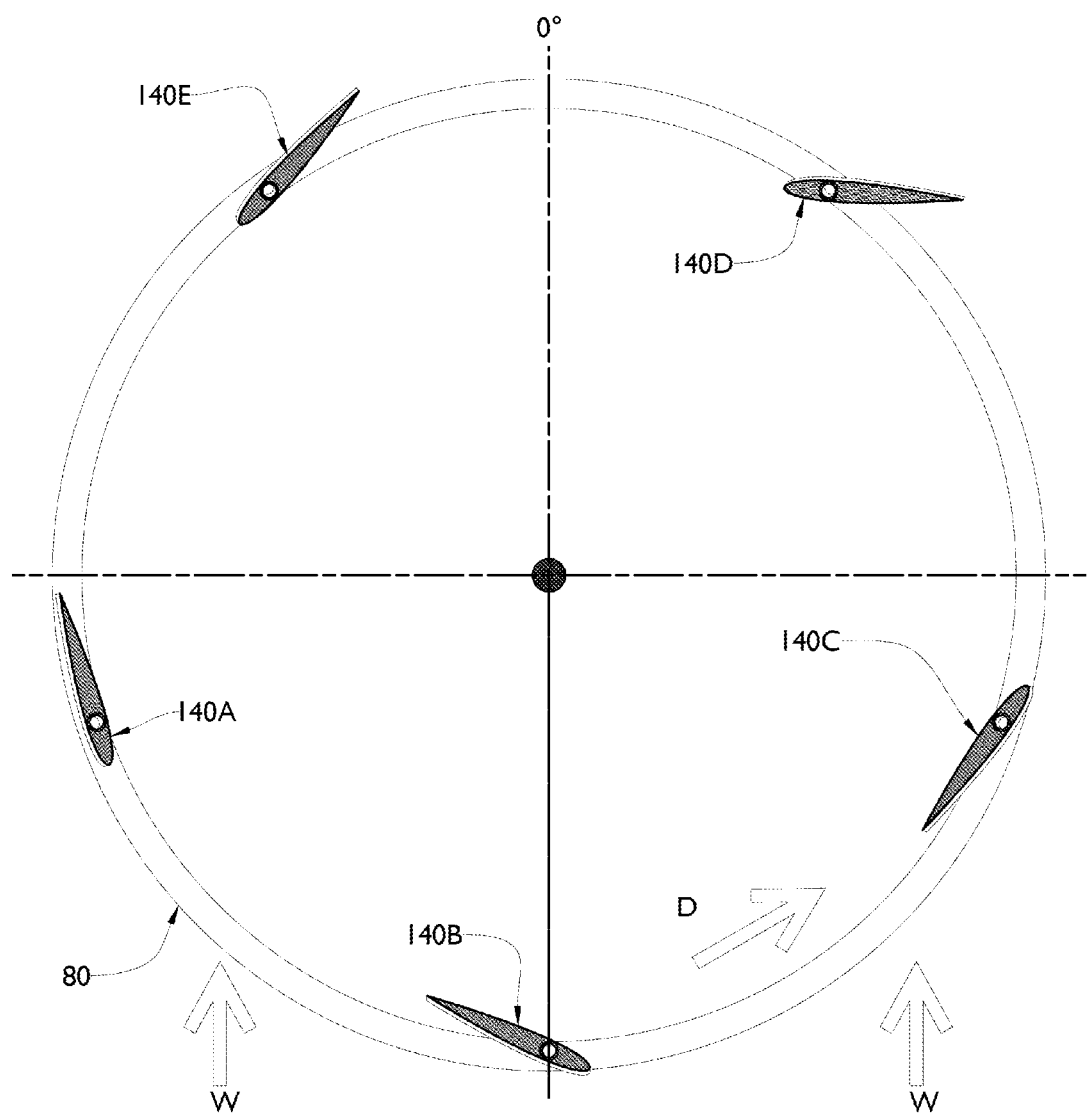
FIG. 14 shows vertical blade angles as the frame of the turbine rotates at a fixed TSR.
Figure 15C:
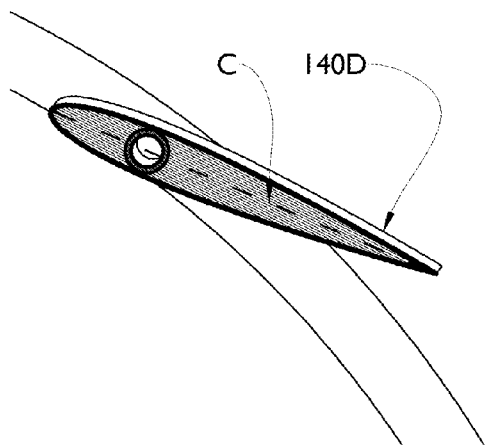
FIGS. 15A-15D are representations of blade feathering angles at a set turbine rotational angle and varying TSR values.
Figure 15D:
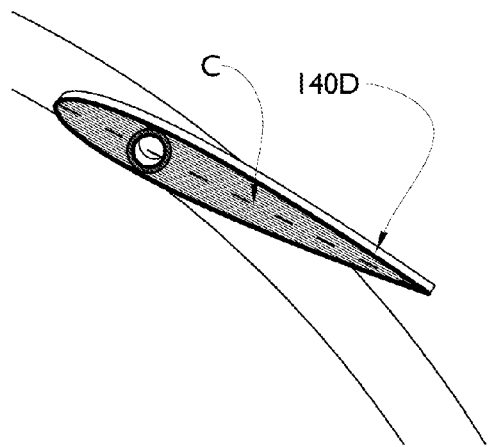
Figure 15A:
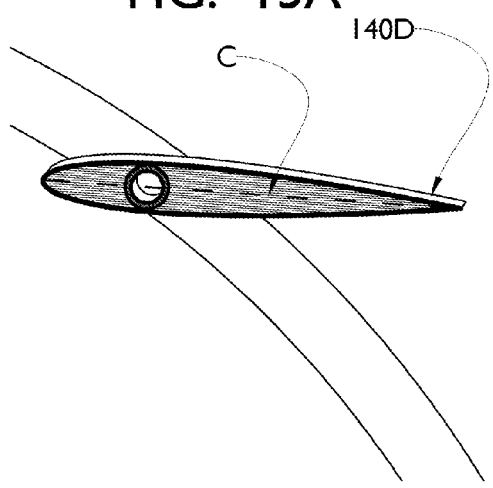
Figure 15B:
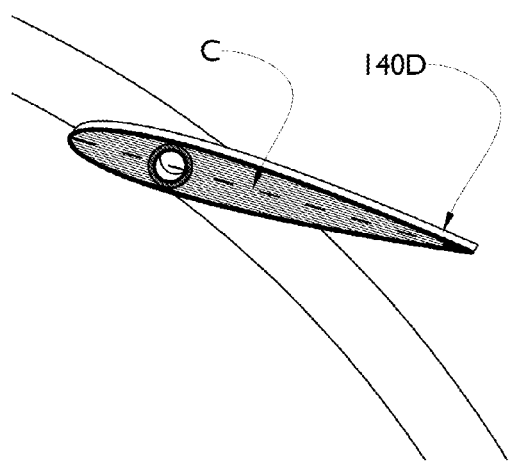
Figure 16:
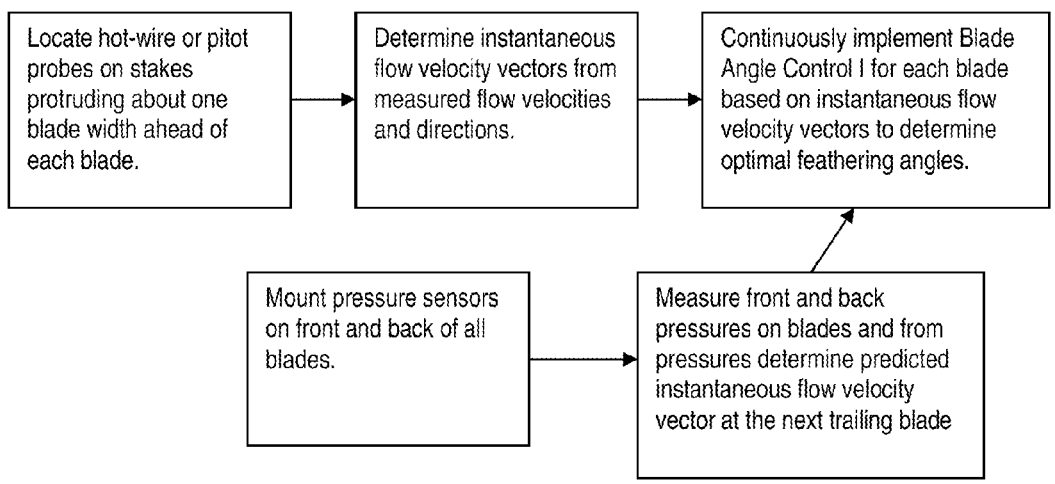
FIG. 16 is a flow chart illustrating instantaneous flow determination techniques.
Figure 17:
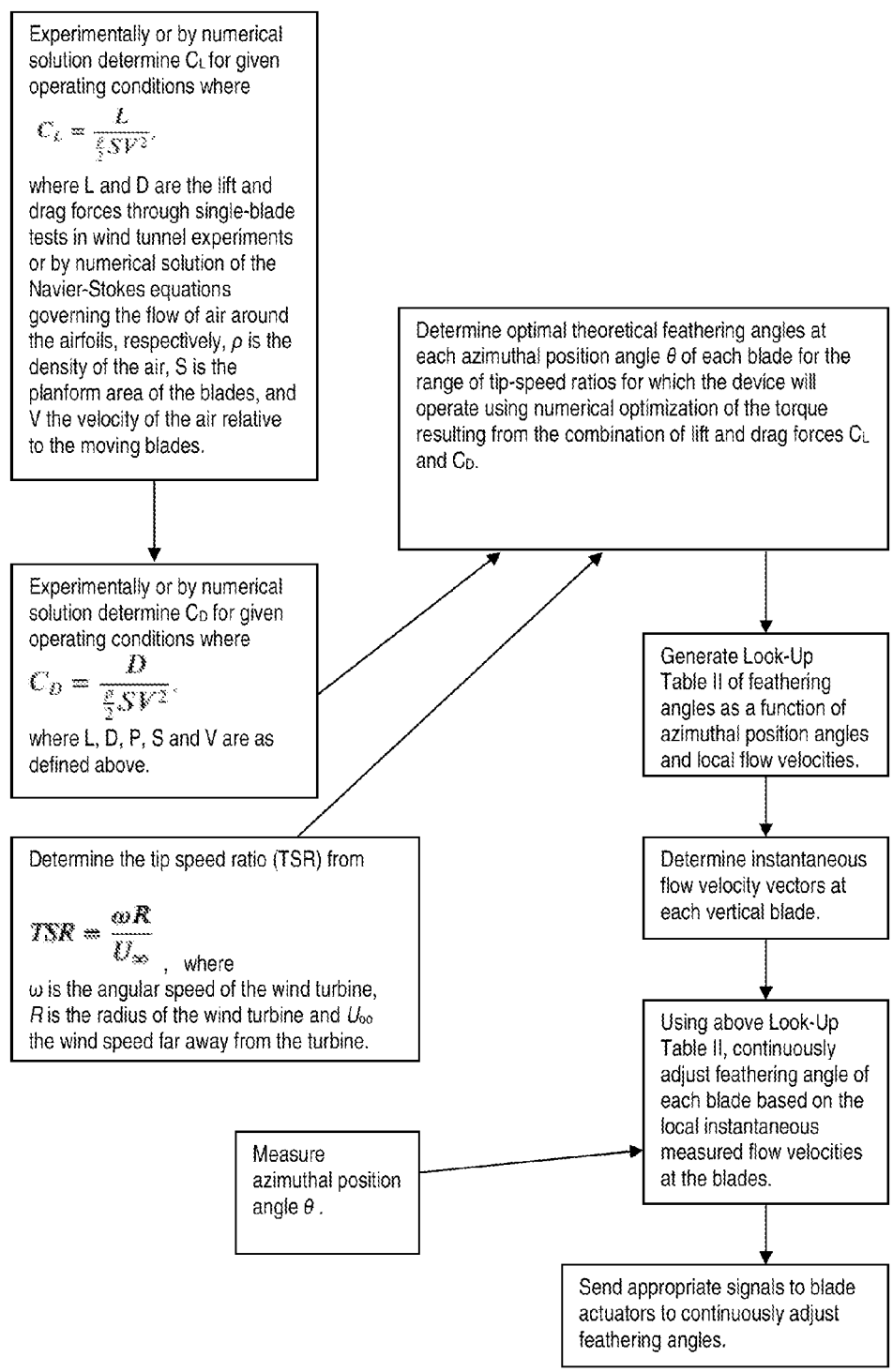
FIG. 17 is a flow chart illustrating the Blade Angle Control I technique.

In FIG. 12B the open frame structure 10 is shown mounted with its bottom 256 at a height relative to roof 238 and primary deflectors 252 which will optimize the movement of a portion of the vertical wind flow through the bottom of the open frame structure and into central passage 12 and into the horizontal blades as shown in FIG. 12C.

Thus, as wind flow W2 strikes the building outer surfaces in FIG. 12C it forms an accelerated upward wind flow W3 (as well as diverging horizontal flow toward each edge of the building). Upward wind flow W3 in turn will be affected by the roof structure of the building as shown causing it to further speed up as it breaks into a first building-induced wind current W4 and a second building-induced wind flow W5.

As shown in this figure, wind flow W4 will flow up through central passage 12 to strike and help drive the horizontal blades and wind flow W5 will strike and help drive the vertical blades. Finally, the back surfaces of the rotating vertical blades of the open frame structure facing into central passage 12 will force generally horizontal wind flow moving past the vertical blades into a flow W6 moving primarily upwardly to further help drive the horizontal blades.

Thus, horizontal wind flow W1 (FIG. 12A) which strikes vertical blades 140A-140E will cause the open frame structure to rotate. A portion of wind flow W1, however, will move past the outer surfaces of the blades and across the center of the open frame structure striking the backs of the opposite blades and be deflected back into the central passage and a portion will escape the leeward side 14 of the turbine. Since very little of this deflected wind will be able to escape through the bottom of the frame, it will generally be deflected upwardly to help drive the horizontal blades.

The use of the terms "a" and "an" and "the" and similar referents in the context of describing the invention are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed.

Finally, preferred embodiments of this invention are described herein, including the best mode currently known to the inventors for carrying out the invention. It should be understood that the illustrated embodiments are exemplary only, and should not be taken as limiting the scope of the invention.

What I claim is:

1. A wind turbine for harvesting energy from both horizontal and vertical wind flow comprising:
    an open frame structure having at least one generally horizontally disposed circular outer blade supporting member mounted for rotation about a central vertical axis passing through the center of the supporting member;
    at least three wind energy harvesting generally vertically disposed and rotatable blades mounted on the circular outer supporting member of the open frame structure and defining a central passage, the vertically disposed and rotatable blades at an angle to the vertical of about ±12°; and
    at least three wind energy harvesting generally horizontally disposed blades projecting radially from the central vertical axis.

2. The wind turbine of claim 1 in which the circular outer blade supporting member is a hoop located at the bottom of the open frame structure and the turbine includes a lower fixed annular guideway in which one of the hoop and the guideway has an annular cavity and the other has an annular flange disposed in the cavity.

3. The wind turbine of claim 1 in which the circular outer blade supporting member is a lower hoop located at the bottom of the open frame structure, the open frame structure includes an upper hoop adjacent the top of the open frame structure, and the vertical blades are disposed between the top and bottom hoops.

4. The wind turbine of claim 2 in which a stationary vertical mast is positioned at the central vertical axis, the mast includes a rotatable hub adjacent to its top, and the open frame structure is attached to the rotatable hub.

5. The wind turbine of claim 1 including a rotatable mast located at the central vertical axis and the open frame structure is attached to the rotatable mast.

6. The wind turbine of claim 1 including a generator package configured to be driven by the circular outer supporting member to generate electricity in response to rotation of the open frame structure.

7. The wind turbine of claim 4 in which the open frame structure includes a central support structure offset from the perimeter of the housing comprising rod and cable supports located inwardly of the periphery of the open frame structure and an upper hoop where:
the upper hoop is affixed to the hub with cabling running from the hub to the hoop that is maintained under tension;
the bottom hoop is hung from the hub by a series of support rods affixed to their proximal ends to the lower hoop and at their distal ends to the hub; and
the upper and lower hoops are interconnected by tensioned cabling from each hoop to the rod to ensure that the hoops rotate in tandem.

8. The wind turbine of claim 1 in which the wind-catching generally horizontally disposed blades are disposed adjacent to the top of the open frame structure.

9. The wind turbine of claim 1 including an equal number of wind-catching generally vertically disposed blades and wind-catching generally horizontally disposed blades where the generally horizontally disposed blades are offset from the generally vertically disposed blades.

10. The wind turbine of claim 1 mounted on the roof of a building or tower with vertical facades that produces building or tower induced generally vertical upwardly directed wind flow as it is struck by natural horizontal wind and the lower hoop is adjacent to at least one roof or tower edge to receive a portion of the vertical upwardly directed wind flow into the central passage to drive the generally horizontally disposed blades.

11. The wind turbine of claim 10 mounted with the lower hoop adjacent at least two roof or tower edges.

12. The wind turbine of claim 10 including at least one wind deflector positioned above a roof edge to help deflect building-induced wind flow into the central passage.

13. A wind turbine for harvesting energy from both horizontal and vertical wind flow comprising:
an open frame structure having at least one generally horizontally disposed circular outer blade supporting member mounted for rotation about a central vertical axis passing through the center of the supporting member;
at least three wind energy harvesting generally vertically disposed and rotatable blades mounted on the circular outer supporting member of the open frame structure and defining a central passage,
where the circular outer blade supporting member is a lower hoop located at the bottom of the open frame structure, the open frame structure includes an upper hoop adjacent the top of the open frame structure, and the vertical blades are disposed between the top and bottom hoops,
where the generally vertically disposed blades include a pivot rod running between the top and bottom hoops and cabling running between at least one intermediate point on the pivot rod and a member of the support structure of the open frame structure to minimize bowing of the vertical blades in response to centrifugal forces on the blades during rotation of the open frame structure; and
at least three wind energy harvesting generally horizontally disposed blades projecting radially from the central vertical axis.

14. The wind turbine of claim 13 in which the circular outer blade supporting member is a hoop located at the bottom of the open frame structure and the turbine includes a lower fixed annular guideway in which one of the hoop and the guideway has an annular cavity and the other has an annular flange disposed in the cavity.

15. The wind turbine of claim 13 in which the circular outer blade supporting member is a lower hoop located at the bottom of the open frame structure, the open frame structure includes an upper hoop adjacent the top of the open frame structure, and the vertical blades are disposed between the top and bottom hoops.

16. The wind turbine of claim 13 including a generator package configured to be driven by the circular outer supporting member to generate electricity in response to rotation of the open frame structure.

17. The wind turbine of claim 16 in which the open frame structure includes a central support structure offset from the perimeter of the housing comprising rod and cable supports located inwardly of the periphery of the open frame structure where:
the upper hoop is affixed to the hub with cabling running from the hub to the hoop that is maintained under tension;
the bottom hoop is hung from the hub by a series of support rods affixed to their proximal ends to the lower hoop and at their distal ends to the hub; and
the upper and lower hoops are interconnected by tensioned cabling from each hoop to the rod to ensure that the hoops rotate in tandem.

18. The wind turbine of claim 13 mounted on the roof of a building or tower with vertical facades that produces building or tower induced generally vertical upwardly directed wind flow as it is struck by natural horizontal wind and the lower hoop is adjacent to at least one roof or tower edge to receive a portion of the vertical upwardly directed wind flow into the central passage to drive the generally horizontally disposed blades.

19. A wind turbine for harvesting energy from both horizontal and vertical wind flow comprising:
an open frame structure having at least one generally horizontally disposed circular outer blade supporting member in the form of a hoop located at the bottom of the open frame structure and a lower fixed annular guideway in which one of the hoop and the guideway has an annular cavity and the other has an annular flange disposed in the cavity, the supporting member being mounted for rotation about a central vertical axis passing through the center of the supporting member;

at least three wind energy harvesting generally vertically disposed and rotatable blades mounted on the circular outer supporting member of the open frame structure and defining a central passage, the vertically disposed and rotatable blades at an angle to the vertical of about ±12°;

at least three wind energy harvesting generally horizontally disposed blades projecting radially from the central vertical axis;

a stationary vertical mast positioned at the central vertical axis, the mast including a rotatable hub adjacent to its top, where the open frame structure is attached to the rotatable hub; and a generator package configured to generate electricity in response to rotation of the open frame structure.

* * * * *